US007063445B2

(12) United States Patent
Wang et al.

(10) Patent No.: US 7,063,445 B2
(45) Date of Patent: Jun. 20, 2006

(54) LUMINAIRE HOUSING WITH RETROFIT PANEL

(75) Inventors: James P. Wang, Blacksburg, VA (US); Marc A. Schetselaar, Christiansburg, VA (US); Richard E. Simon, Roanoke, VA (US)

(73) Assignee: Hubbell Incorporated, Orange, CT (US)

( * ) Notice: Subject to any disclaimer, the term of this patent is extended or adjusted under 35 U.S.C. 154(b) by 37 days.

(21) Appl. No.: 10/231,475

(22) Filed: Aug. 30, 2002

(65) Prior Publication Data

US 2004/0042218 A1 Mar. 4, 2004

Related U.S. Application Data

(63) Continuation-in-part of application No. 10/184,055, filed on Jun. 28, 2002, now Pat. No. 6,755,559.

(51) Int. Cl.
*B60Q 1/00* (2006.01)

(52) U.S. Cl. ...................... 362/368; 362/147; 362/287; 362/372

(58) Field of Classification Search ................ 362/145, 362/147, 270, 269, 285, 287, 371, 372, 368, 362/404, 427
See application file for complete search history.

(56) References Cited

U.S. PATENT DOCUMENTS

| | | | | |
|---|---|---|---|---|
| 2,140,474 | A | 12/1938 | Gullicksen | |
| 3,185,835 | A | 5/1965 | Müller et al. | |
| 4,398,239 | A * | 8/1983 | de Vos et al. | 362/263 |
| 4,791,539 | A | 12/1988 | Ewing | |
| 5,093,769 | A * | 3/1992 | Luntsford | 362/269 |
| 5,727,871 | A | 3/1998 | Kotloff | |
| 5,851,061 | A * | 12/1998 | Hegarty | 362/20 |
| 5,927,843 | A | 7/1999 | Haugaard et al. | |
| 5,997,158 | A | 12/1999 | Fischer et al. | |
| 6,059,424 | A | 5/2000 | Kotloff | |
| 6,149,280 | A | 11/2000 | Quiogue et al. | |
| 6,168,300 | B1 | 1/2001 | Fischer et al. | |
| 6,182,848 | B1 | 2/2001 | Wang | |
| 6,276,818 | B1 * | 8/2001 | Wang | 362/374 |
| 6,422,720 | B1 | 7/2002 | Fischer et al. | |

* cited by examiner

*Primary Examiner*—John Anthony Ward
(74) *Attorney, Agent, or Firm*—Alfred N. Goodman; Mark S. Bicks

(57) ABSTRACT

A luminaire retrofit panel including a main wall adapted to support a luminaire in a central opening of the main wall, and including an outer perimeter. A side wall extends from the outer perimeter of the main wall. A plurality of secondary walls extend from the side wall and extend over a portion of the main wall toward the central opening of the main wall. The secondary walls are substantially parallel to the main wall. The plurality of secondary walls support at least one hinge and at least one latch. The hinge is engagable with a frame and allows the main wall to pivot with respect the frame. The latch is engagable with the frame to hold the main wall to releasably secure the main wall to the frame.

36 Claims, 14 Drawing Sheets

LUMINAIRE HOUSING WITH RETROFIT PANEL

RELATED APPLICATIONS

This application is a continuation-in-part of commonly assigned U.S. Ser. No. 10/184,055, filed Jun. 28, 2002, entitled Luminaire With Adjustable Lamp to James P. Wang et al., which issued on Jun. 29, 2004 as U.S. Pat. No. 6,755,559.

FIELD OF THE INVENTION

The present invention relates to a luminaire adapted to mount to a canopy or ceiling that can support a lamp in different orientations. Additionally, the present invention relates to a luminaire that facilitates installation and replacement of the lamp. More specifically, the luminaire includes a socket holder capable of supporting the lamp in first and second orientations and that is movable between unlocked and locked positions.

Also, the present invention relates to a luminaire housing having a removable panel that supports the luminaire. More specifically, the removable panel can fit various existing luminaire housings.

BACKGROUND OF THE INVENTION

A luminaire is a light fixture that is typically mounted to a canopy, ceiling or light pole. Conventional luminaires include a ballast electrically connected to a socket and lamp, and an optical refractor or lens that encloses the lamp and allows light rays from the lamp to emanate therethrough.

Conventional luminaires generally provide only one lamp orientation, usually either vertical or horizontal. Additionally, problems arise in installing and maintaining conventional luminaires. For example, installation often requires more than one person. Also, performing maintenance such as replacing the lamp often requires disassembly of the luminaire. Also, some conventional luminaires are bulky and include unnecessary parts. Moreover, some conventional luminaires are not easily adaptable to a variety of optical refractors.

Additionally, some conventional luminaires include removable or retrofit panels. However, conventional retro-fit panels are often difficult to latch and leave unsightly hardware or fasteners exposed. Also, conventional luminaires that use retro-fit panels often do not provide adequate protection to electrical shock, particularly when removing or opening the panel.

Examples of conventional luminaires include U.S. Pat. Nos. 6,394,628, 6,276,818 and 6,182,848 to Wang; U.S. Pat. Nos. 6,367,945 and 6,264,344 to Quioque et al.; U.S. Pat. Nos. 6,224,233, 6,059,422, and 5,662,407 to Fischer et al.; U.S. Pat. No. 4,388,681 to Meyer; U.S. Pat. No. 4,186,433 to Baldwin; and U.S. Pat. No. 2,675,466 to Baker, the subject matter of each of which is herein incorporated by reference.

SUMMARY OF THE INVENTION

Accordingly, an object of the present invention is to provide a luminaire capable of supporting a light source, such as a lamp, in at least two different orientations.

Another object of the present invention is to provide a luminaire that facilitates installation and maintenance thereof, particularly when replacing the light source or lamp of the luminaire.

Yet another object of the present invention is to provide a luminaire that is compact and includes a minimal number of parts.

Still another object of the present invention is to provide a luminaire that allows a variety of optical assemblies to be used with the luminaire.

Another object of the present invention is to provide a luminaire housing that includes a panel that can be used in a retrofit application and is easily latched and hides hardware and fasteners used with the panel.

A further object to the present invention is to provide a luminaire housing that includes a panel with a safety mechanism for protection against electrical shock particularly when opening the panel.

The foregoing objects are basically attained by a luminaire comprising an optical assembly that has a mounting interface. A socket holder has a mounting member that is adapted to mount the socket holder to the mounting interface of the optical assembly. First and second proximate surfaces are adapted to support a socket and a light source in first and second orientations, respectively. The socket holder defines a central axis. A longitudinal axis is defined by the socket and the light source in the first orientation is substantially parallel to the central axis of the socket holder and a longitudinal axis of the socket and the light source in the second orientation is angled with respect to the central axis of the socket holder.

The foregoing objects are also attained by a luminaire, comprising an optical assembly having a mounting interface including at least one mounting aperture. A socket holder is coupled to the optical assembly and supports a socket and a light source at a first end. The socket holder is movable between locked and unlocked positions with respect to the mounting interface of the optical member. Socket holder includes a mounting member at a second end opposite the first end that is adapted to mount the socket holder to the mounting interface of the optical assembly. The mounting member has a guide portion and a locking portion engaged with the mounting aperture of the mounting interface of the optical assembly in the locked position thereby interlocking the socket holder and optical assembly, and disengaged with the mounting aperture in the unlocked position, wherein the guide portion facilitates engagement and disengagement of the locking portion with the mounting aperture.

The foregoing objects are also attained by a luminaire comprising a support panel and an optical assembly including a reflector coupled to a refractor. The reflector is releasably secured to the support panel thereby substantially restricting movement of the optical assembly with respect to the support panel. The reflector includes a mounting interface. A socket holder is coupled to the reflector of the optical assembly at the mounting interface. The socket holder is movable between locked and unlocked positions with respect to the reflector and the optical assembly. The socket holder supports a socket and a light source with the reflector and the refractor substantially enclosing the light source.

The foregoing objects are also attained by a luminaire retrofit panel including a main wall adapted to support a luminaire in a central opening of the main wall, and including an outer perimeter. A side wall extends from the outer perimeter of the main wall. A plurality of secondary walls extend from the side wall and extend over a portion of the main wall toward the central opening of the main wall. The secondary walls are substantially parallel to the main wall. The plurality of secondary walls support at least one hinge and at least one latch. The hinge is engagable with a frame and allows the main wall to pivot with respect the frame. The latch is engagable with the frame to hold the main wall to releasably secure the main wall to the frame.

The foregoing objects are also attained by a luminaire housing including a frame and a panel releasably coupled to the frame and movable between open and closed positions with respect to the frame. The panel has a main wall for supporting a luminaire and includes an outer perimeter. A side wall extends from the outer perimeter of the main wall. A plurality of secondary walls extend from the side wall and extend over a portion of the main wall. The secondary walls are spaced from the main wall by the side wall. The plurality of secondary walls support at least one hinge and at least one latch. The hinge is pivotally engaged with the frame thereby allowing the panel to move between the open and closed positions. The latch is engaged with the frame to hold the panel in the closed position and disengaged with the frame when the panel is in the open position.

The foregoing objects are also attained by a luminaire housing including a frame and a panel releasably coupled to the frame and movable between open and closed positions with respect to the frame. The panel has a main wall for supporting a luminaire and includes an outer perimeter. A side wall extends from the outer perimeter of the main wall. At least one secondary wall extends from the side wall and over a portion of the main wall, the secondary wall includes a guide slot with first and second opposite ends. A first latch is supported by the secondary wall. The first latch includes a latching plate and a coupling extension extending from the latching plate and through the guide slot of the secondary wall coupling the latching plate to the secondary wall. The coupling extension is slidable between the first and second ends of the guide slot to move the latching plate between latched and unlatched positions, respectively.

The foregoing objects are also attained by a luminaire housing including a frame and a panel releasably coupled to the frame and movable between open and closed positions with respect to the frame. The panel supports a luminaire. A switch assembly is supported by the panel and includes a switch housing having a lever pivotally coupled thereto and at least one electrical switch received within the switch housing. The electrical switch being electrically connected to the luminaire. The lever engages the frame and engages the electrical switch when the panel is in the closed position thereby turning on power to the luminaire. The lever is disengaged from the frame and releases the electrical switch when the panel is in the open position.

Other objects, advantages and salient features of the invention will become apparent from the following detailed description, which, taken in conjunction with annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Embodiment of FIGS. 1–10

Figure 1:
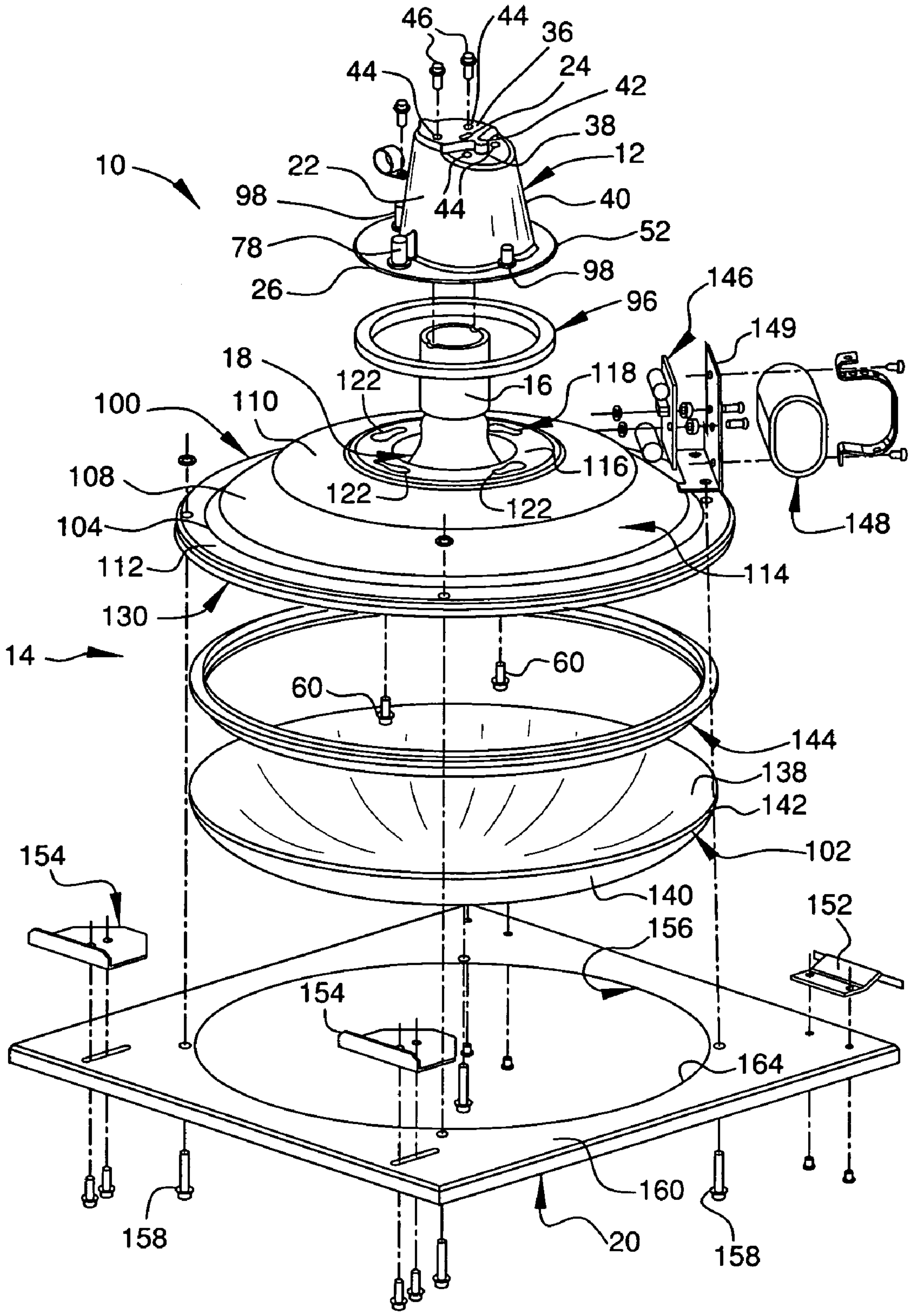
FIG. 1 is an exploded perspective view of a luminaire in accordance with a first embodiment of the present invention showing a socket holder, optical assembly and support panel.
Figure 2:
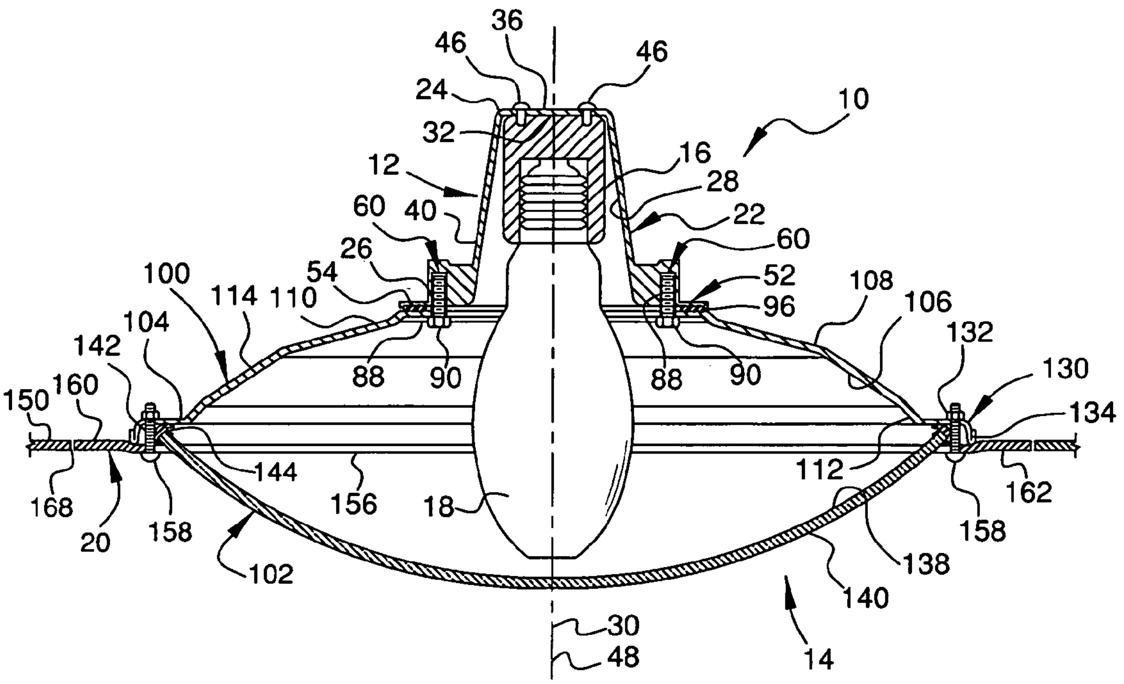
FIG. 2 is an elevational side view taken in section of the assembled luminaire illustrated in FIG. 1, showing a light source of the luminaire in a first orientation.
Figure 3:
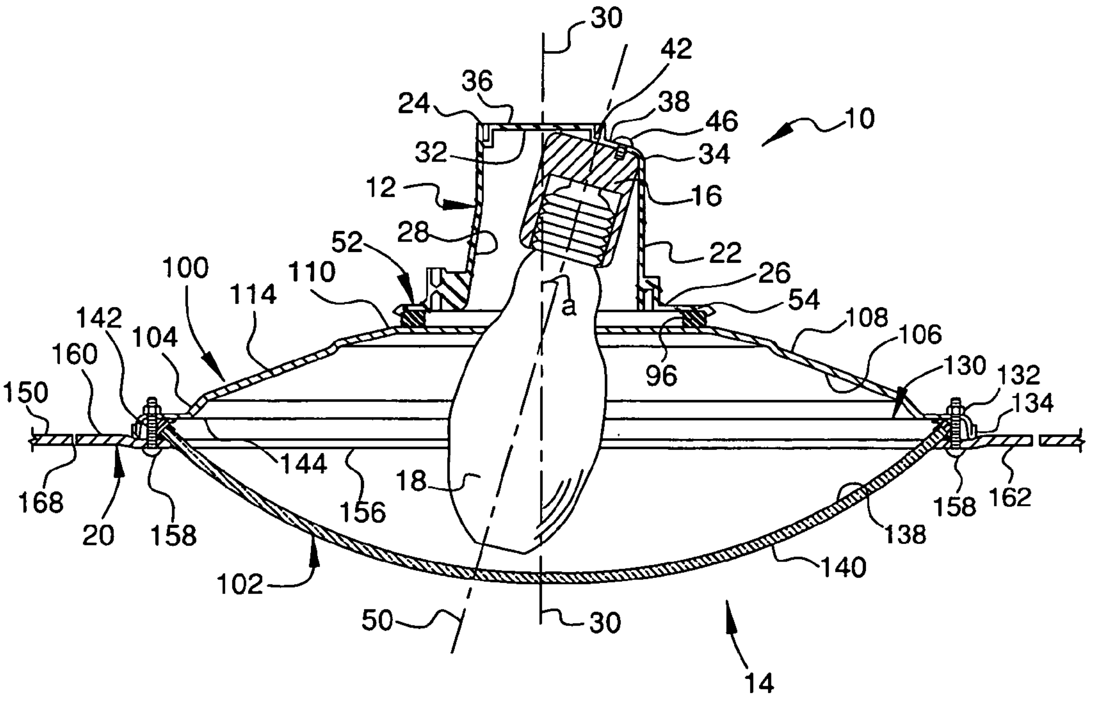
FIG. 3 is an elevational side view taken in section traverse to the sectional view of the luminaire illustrated in FIG. 2, showing the light source of the luminaire in a second orientation.

Referring to FIGS. 1–10, a luminaire 10 in accordance with a first embodiment the present invention includes a socket holder 12 releasably coupled to an optical assembly 14. Socket holder 12 supports a socket 16 and a light source 18, which is preferably a high intensity discharge lamp. Optical assembly 14 encloses light source 18 and allows light rays to emanate therefrom. Socket holder 12 can support light source 18 in more than one orientation, as seen in FIGS. 2 and 3, allowing selection of a desired orientation. Luminaire 10 is mounted to a support panel 20, such as a canopy or a panel retrofitable to a canopy.

Socket holder 12 generally includes a housing 22 with a first end 24 that supports socket 16 and light source 18 and a second end 26 that is adapted to mount socket holder 12 to optical assembly 14. Housing 22 is preferably conical in shape and hollow thereby defining an inner receiving area 28 for receiving socket 16 and the end of light source 18 engaged with socket 16. Housing 22 is also preferably formed of a substantially heat resistant material, such as metal, and is a unitary one-piece member.

First end 24 of housing 22, which is preferably the top end of housing 22, defines a central axis 30 and first and second surfaces 32 and 34 for supporting socket 16 and light source 18 in first and second orientations, respectively, as seen in FIGS. 2 and 3. An optional cap 35, see FIG. 4, can be used to cover first end 24 thereby protecting socket 18. First and second surfaces 32 and 34 are preferably proximate or close to one another. First and second surfaces 32 and 34 are preferably disposed on first and second walls 36 and 38, respectively. First wall 36 is substantially horizontal with respect to the sidewall 40 of housing 22. Second wall 38 extends away from first wall 36 and is angled with respect thereto. A shoulder wall 42 joins first and second walls 36 and 38. Disposed in both the first and second walls 36 and 38 are fastening holes 44 that receive fasteners 46 for securing socket 16 to either first wall 36 in the first orientation or second wall 38 in the second orientation.

As seen in FIG. 2, socket 16 is secured to first wall 36 by fasteners 46 so that light source 18 is in the first orientation. In the first orientation, first wall 36, socket 16 and light source 18 define a longitudinal axis 48 that is substantially parallel to central axis 30 of socket holder 12. The first orientation is preferably a substantially vertical orientation when luminaire 10 is mounted to support panel 20 that is substantially horizontal such that longitudinal axis 48 is substantially perpendicular to panel 20. However, if luminaire 10 is mounted to a vertical support panel or sidewall, or is mounted to a slanted support panel or wall, then the first orientation of socket 16 and light source 18 would be substantially perpendicular to the panel.

As seen in FIG. 3, second wall 38, socket 16 and light source 18 define a second longitudinal axis 50 in the second orientation. Second longitudinal axis 50 is angled with respect to central axis 30 of socket holder 12. An angle a is defined between longitudinal axis 50 and central axis 30. Angle a is preferably acute, such as 15 degrees, however, angle a can be substantially 0 degrees or substantially 90 degrees.

Although it is preferable that first wall 36 is substantially horizontal and second wall 38 is substantially angled therefrom, first wall 36 can also be angled thereby changing the first orientation of socket 16 and light source 18. For example, the first and second walls 36 and 38 can converge and meet to form an inverted V so that each longitudinal axis 48 and 50, respectively, is angled with respect to socket holder central axis 30. Similarly, the angle of second wall 38 can be varied between being generally aligned with first wall 36 so that longitudinal axes 48 and 50 are substantially parallel, and being generally perpendicular to first wall 36 so that second longitudinal axis 50 is substantially perpendicular to longitudinal axis 48.

The second end 26 of housing 22, which is preferably the bottom end, includes an outwardly extending circumferential flange 52 extending from a bottom edge of housing 22. Flange 52 includes generally planar upper and lower surfaces 54 and 56 and an outer shoulder 58. First and second mounting members 60 are supported by flange 52 and engage optical assembly 14. Although it is preferable to use two mounting members 60, any number of mounting members 60 can be employed and only one mounting member 60 is required.

Figure 4:
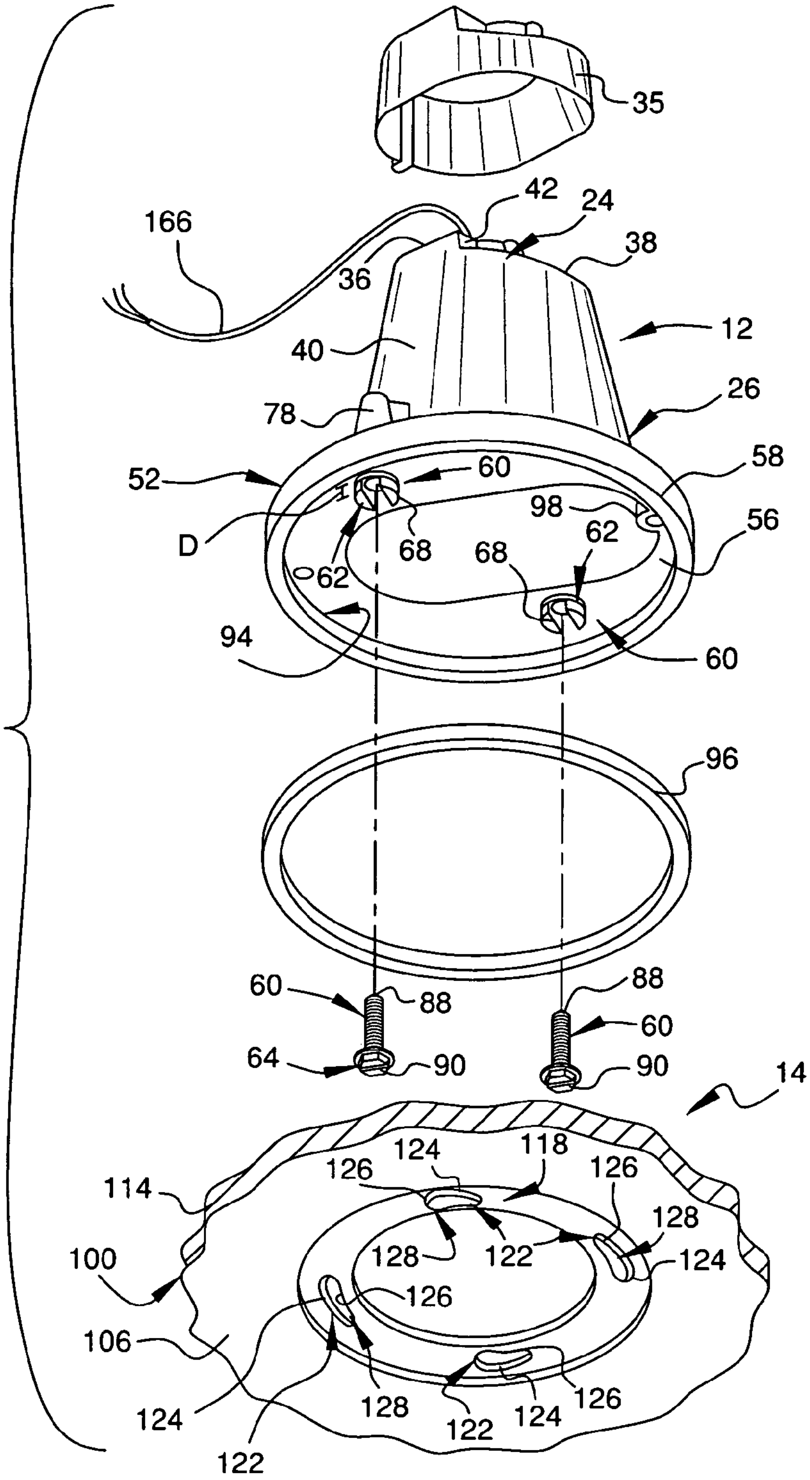
FIG. 4 is an exploded perspective view of the socket holder of the luminaire illustrated in FIG. 1 including a partial perspective view of the optical assembly of the luminaire.
Figure 5:
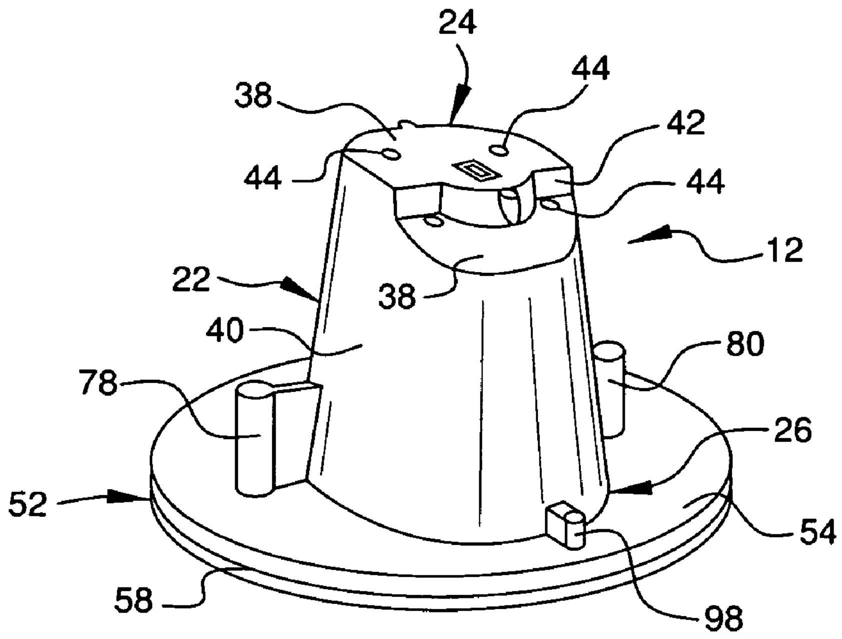
FIG. 5 is a perspective view of the socket holder of the luminaire illustrated in FIG. 1.

Each mounting member 60 includes a guide portion 62 for facilitating engagement of the mounting members 60 with optical assembly 14 and a locking portion 64 for interlocking the mounting members 60 with optical assembly 14, as seen in FIG. 4. Locking portion 64 is preferably a mounting bolt.

Figure 6:
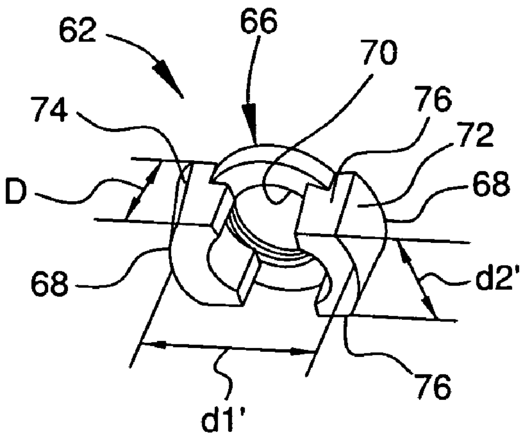
FIG. 6 is a perspective view of a guide portion of the luminaire illustrated in FIG. 1.

As seen in FIG. 6, guide portion 62 includes a ring body 66 with depending arcuate ears 68 extending from opposite radial sides of ring body 66. The central opening 70 of ring body 66 is threaded. A first dimension d1' of guide portion 62 is defined between the outer surfaces 72 and 74 of ears 68 respectively. A second dimension d2' of guide portion 62 is defined between the sides 76 of each ear 68. Each guide portion ring body 66 is attached to flange lower surface 56 so that ears 68 extend downwardly from flange lower surface 56 at substantially ninety degrees, as seen in FIG. 4. Although it is preferably to use ring body 66, body 66 can be eliminated such that ears 68 are directly attached to and extend from flange lower surface 56. Central opening 70 of each ring body 66 is aligned with first and second threaded receiving wells 78 and 80, respectively.

Figure 7:
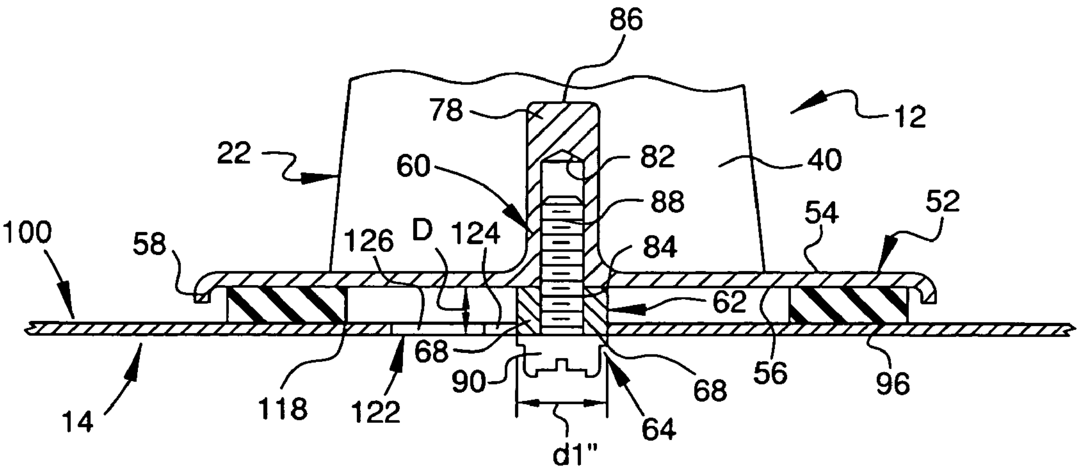
FIG. 7 is a partial elevational side view taken in section of the luminaire illustrated in FIG. 2, showing the socket holder and a mounting member thereof in an unlocked position with respect to the optical assembly.
Figure 8:
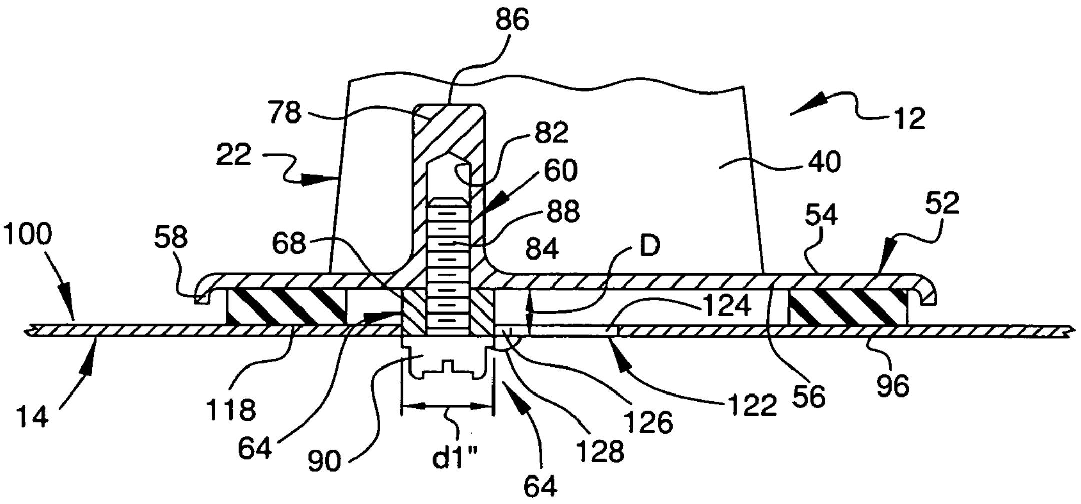
FIG. 8 is a partial elevational side view taken in section of the luminaire illustrated in FIG. 2, showing the socket holder and the mounting member thereof in a locked position with respect to the optical assembly.

As seen in FIGS. 7 and 8, first and second receiving wells 78 and 80 each extend upwardly from flange upper surface 54 and includes a hollow threaded interior 82, an open end 84 aligned with ring body 66 and an opposite closed end 86. Each guide portion 62 and corresponding receiving wells 78 or 80 are preferably disposed on opposite sides of socket holder housing 22. Threaded central opening 70 of ring body 66 of guide portion 62 and threaded interior 82 of each receiving well 78 and 80 are adapted to engage a part of locking portion 64, preferably a threaded stem 88 of the locking portion or mounting bolt 64.

Figure 9:
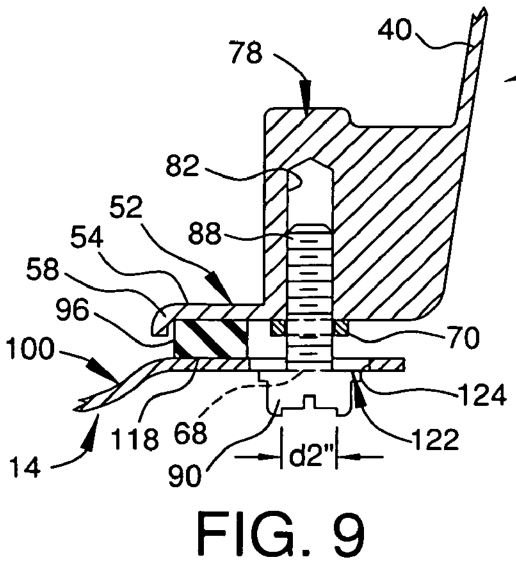
FIG. 9 is a partial elevational side view taken in section traverse to the sectional view of FIG. 7, showing the socket holder in the unlocked position.
Figure 10:
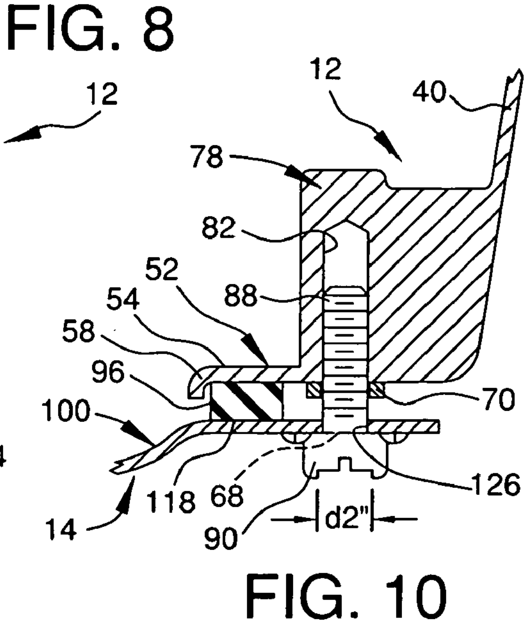
FIG. 10 is a partial elevational side view taken in section traverse to the sectional view of FIG. 8, showing the socket holder in the locked position.

Locking portion 64 of each mounting member 60 includes a bolt head 90 at a distal end of stem 88. Mounting bolt head 90 is adapted to engage a part of optical assembly 14, thereby interlocking socket holder 12 and optical assembly 14. The diameter of mounting bolt head 90 defines a first dimension d1" of locking portion 64, as best seen in FIGS. 7 and 8, that is substantially the same as the first dimension d1' of guide portion 62. A second dimension d2" of locking portion 64 is defined by the diameter of mounting bolt stem 88, as best seen in FIGS. 9 and 10, that is substantially the same as the second dimension d2' of guide portion 62. As such, when locking portion 64 is coupled with guide portion 62, the ears 68 of guide portion 62 will be as wide, i.e. the first dimension d1', as locking portion bolt head 90, i.e. the first dimension d1", as seen in FIGS. 6, 7 and 8. Ears 68 will also be as narrow, i.e. the second dimension d2', as locking portion stem 88, i.e. the second dimension d2", as seen in FIGS. 6, 9 and 10 (ears 68 being shown in dashed lines). This design facilitates engagement of locking portion 64 with optical assembly 14.

A gasket receiving recess 94 is formed between shoulder 58 and the lower surface 56 of flange 52. A ring shaped gasket 96 is received in recess 94. Gasket 96 abuts flange lower surface 56 and is disposed outside of mounting members 60 and adjacent outer shoulder 58 of flange 52. Gasket 96 is preferably made of compressible foam but can be any known compressible material such as rubber, felt and silicone. Secondary receiving wells 98 can be optionally included on socket housing 22 that are similar to but smaller than receiving wells 78 and 80. Secondary receiving wells 98 allow socket holder 12 to attached directly to support panel 20 as will be described below with respect to the second embodiment.

As seen in FIGS. 4 and 6–8, the distance D that guide portion ears 68 extend from the lower surface 56 of socket housing flange 52 controls the depth at which locking portion bolt stem 88 of each mounting member 60 extends or is threaded into receiving wells 78 and 80. This dictates the appropriate location of locking portion 64, particularly bolt head 90, for proper securement of locking portion 64 with optical assembly 14. This prevents locking portion 64 of each mounting members 60 from being threaded into receiving wells 78 and 80 too far which would create difficulty in engaging locking portion 64 with optical assembly 14, or not far enough which would create a loose or less secure engagement of locking portion 64 with optical assembly 14.

As seen in FIGS. 1–3, optical assembly 14 generally includes a reflector 100 coupled to a refractor 102 with light source 18 being enclosed therebetween. Reflector 100 is preferably bowl shaped with a circular outer perimeter 104 and inner and outer curved surfaces 106 and 108. Reflector 100 includes first and second end portions 110 and 112 with first end portion 110 being substantially smaller than second end portion 112. A reflector wall 114 extends between first and second end portions 110 and 112 and slopes or tapers outwardly from first end portion 11 to second end portion 112. Although it is preferable that reflector 100 is bowl shaped, reflector 100 can be other shapes such as a box or plate shaped as long as reflector 100 can engage support panel 20.

First end portion 110 of reflector 100 includes a central planar surface 116 having a mounting interface 118 for engaging mounting members 60 of socket holder 12 and a central opening 120 for receiving light source 18. Mounting interface 118 preferably includes mounting apertures 122 that engage locking portions 64 of mounting members 60. Mounting apertures 122 are preferably key hole shaped and disposed concentrically around central opening 120. Each key hole mounting aperture 122 includes first and second sections 124 and 126 with first section 124 being substantially larger than second section 126. A pair of locking detents 128 are also disposed of either side of each mounting aperture 122.

Second end portion 112 of reflector 100 includes an outer shoulder 130 extending from outer perimeter 104 and is formed by a first wall 132 that extends outwardly and a second wall 134 extending generally perpendicularly from first wall 132. Attached to the outer surface 108 of reflector 100 at shoulder first wall 132 is a conventional starter 146 and conventional capacitor 148 supported on a bracket 149, as seen in FIG. 1. Although it is preferable that reflector 100 supports starter 146 and capacitor 148, starter 146 and capacitor 148 can be located remotely therefrom such as on support panel 20.

Refractor 102 is preferably a glass lens but can be formed of a plastic material as well. Refractor 102 has bowl shape with smooth inner and outer surfaces 138 and 140 and an outer edge 142. A ring shaped gasket 144 is disposed between reflector 100 and refractor 102 and is preferably disposed on outer edge 142 of refractor 102. Gasket 144 is preferably made of a rubber material but can be made of any known material such as felt.

Support panel 20 is preferably a panel that can be retrofit into an existing canopy or ceiling 150 (see FIGS. 2 and 3) in the same manner disclosed in commonly owned U.S. Pat. No. 6,276,818 to Wang and entitled Latch Assembly For Luminaire Housing Door, and U.S. Pat. No. 6,182,848 to Wang and entitled Luminaire Housing With Universal Dual Surface cantilever Hinge, the subject matter of each of which is herein incorporated by reference. In such a retrofit application, support panel 20 includes at least one hinge 152 and at least one latch 154 for mounting the panel 20 to an existing canopy or ceiling in the same manner described in U.S. Pat. No. 6,394,628. However, support 20 can also be just the canopy or ceiling in new installation applications.

Support panel 20, whether in a retrofit or new installation application, includes an opening 156 for supporting optical assembly 14. Securing fasteners 158 are used to secure reflector 100 and refractor 102 with respect to panel 20 thereby securing optical assembly 14 and restricting the movement thereof with respect to panel 20. Support panel also includes generally planar upper and lower surfaces 160 and 162. Opening 156 is defined by a perimeter edge of 164.

Assembly of Embodiment of FIGS. 1–10

Assembly of luminaire 10 initially requires mounting socket holder 12 to optical assembly 14 at the mounting interface 118 of reflector 100. Specifically, locking portions 64 of each mounting member 60 are coupled to corresponding guide portions 62 and receiving wells 78 and 80, respectively, of socket housing 22. Since mounting members 60 are substantially identical, the assembly of only one mounting member 60 is described. Mounting bolt stem 88 of mounting member 60 is threaded through central opening 70 of a respective guide portion ring body 66 and into a threaded receiving well 78 and 80, respectively, (see FIG. 7, showing receiving well 78) until mounting bolt head 90 abut ears 68 of the guide portion 62. This places mounting bolt head 90 at the appropriate distance from socket housing flange 52 for proper engagement with reflector 100 of optical assembly 14.

Socket holder 12 can then be mounted to mounting interface 118 of reflector 100 by inserting mounting bolt heads 90 of each mounting member 60 into first sections 124 of respective mounting aperture key holes 122 of the mounting interface 118, as seen in FIG. 7. Since mounting members 60 of socket holder 12 are substantially identical and key holes 122 are substantially identical, the engagement of only one mounting member and one key hole 122 is described. In this initial position, socket holder 12 is unlocked with respect to reflector 100, the bottom of ears 68 of mounting member guide portion 62 abut a distal edge 136 of key hole first section 124. Also, mounting bolt head 90 is located just below reflector wall 114 with mounting bolt stem 88 extending through key hole first section 124. The first dimension d1' of guide portion ears 68 and the first dimension d1" of mounting bolt head 90 are slightly less than the width of key hole first section 124 allowing easy insertion of mounting bolt head 90 and ears 68 into key hole first section 124, as seen in FIG. 9. Gasket 96 is received in receiving recess 94 of socket holder 12 and rests on outer surface 108 of reflector wall 114 surrounding mounting aperture key holes 122. Gasket 96 is sandwiched between socket housing flange 52 and reflector 100.

Socket holder 12 can then be rotated about its central axis 30, preferably clockwise, to a locked position with reflector 100 remaining stationary. Specifically, while rotating socket holder 12, gasket 96 is compressed, thereby lowering mounting bolt head 90 with respect to reflector wall 114 to clear locking detents 128 located on reflector wall inner surface 106 as guide portion 62 and mounting bolt stem 88 pass from key hole first section 124 to key hole second section 126. Once locking detents 128 are cleared, socket holder 12 is released allowing gasket 96 to expand to its near normal thickness, thereby lifting mounting bolt head 90 until it abuts reflector wall inner surface 106 to provide a tight engagement between mounting bolt head 90 and reflector wall 114. Gasket 96 also provides a seal against water and insects. In this locked position, ears 68 of mounting member 60 abut a distal edge 137, opposite distal edge 136, of second section 126 of mounting aperture key hole 122. Since the second dimension d2' of ears 68 is less than the mounting bolt head first dimension d1" and is generally equal to mounting bolt stem dimension d2", ears 68 fit into key hole second section 126, as seen in FIG. 10. Mounting bolt head 90 is trapped underneath reflector wall 114 with locking detents 128 preventing lateral movement of mounting member 60, as seen in FIGS. 8 and 10.

To move socket holder 12 back to the unlocked position, gasket 96 is again compressed while socket holder 12 is rotated about central axis in a direction opposite that direction to lock socket holder 12, preferably a counter clockwise direction. By compressing gasket 96, mounting bolt head 90 is lowered and clears locking detents 128 as ears 68 and mounting bolt stem 88 pass from key hole second section 126 back to key hole first section 124. Socket holder 12 can then be disengaged from reflector 100 by lifting mounting member 60, specifically mounting bolt head 90 and ears 68 from key hole first section 124. Since ears 68 have the same width or first dimension d1 as mounting bolt head first dimension d1", disengagement and removal of mounting bolt head 90 from key hole 122 is facilitated. In particular, ears 68 will abut distal edge of key hole first section 124 thereby so that mounting bolt head 90 can be pulled straight through key hole first section 124 without interference from reflector wall 114. Without ears 68, a portion of mounting bolt head 90 would likely slide underneath reflector wall 114 so that when attempting to pull mounting bolt head 90 through key hole first section 124, that portion of mounting bolt head 90 would abut inner surface 106 of reflector wall 114, thereby preventing easy removal of mounting bolt head 90.

The mounting member 60 and key hole 122 arrangement is preferably used to releasably secure socket holder 12 to reflector 100 of optical assembly 14 since this allows easy installation of socket holder 212 and light source 18 and facilitates replacement of light source 18 by simply rotating and unlocking socket holder 12. However, other known mounting mechanisms can be used such as using brackets or clips. Also, a fixed attachment can be used to secure socket holder 12 and reflector 100 such as by welding or using a sealant or adhesive. Additionally, although it is preferable that each mounting member 60 be formed of a separate guide portion 62 and locking portion 64 coupled together, each mounting member 60 can be formed as a one-piece member incorporating guide portion 62 and locking portion 64.

Socket 16 and light source 18 can then be mounted to socket holder 12 in a desired position, i.e. in the first or second orientation. In the first orientation, socket 16 is secured to first surface 32 on first wall 36 by fasteners 46 so that socket 16 abuts first wall 36 and the longitudinal axis 48 of light source 18 is generally parallel to central axis 30 of socket holder 12, as seen in FIG. 2. Similarly, in the second orientation, socket 16 is secured to second surface 34 on second wall 38 by fasteners 48 so that the longitudinal axis 50 of light source 18 is angled with respect to socket holder central axis 30, as seen in FIG. 3. In either orientation, light source 18 extends through central opening 120 of first end portion 110 of reflector 100.

Optical assembly 14 is mounted to support panel 20 by securing reflector 100 to the upper surface 160 of panel 20 with outer edge 142 of refractor 102 being disposed between reflector 100 and panel 20, as best seen in FIGS. 2 and 3. Socket holder 12 can be mounted to reflector 100 as described above either before or after optical assembly 14 is mounted to support panel 20. Refractor 102 is placed in panel opening 156 allowing refractor 102 to drop below panel 20 due to its bowl shape with the outer edge 142 remaining above panel 20. The outer surface 140 of refractor 102 rests on the perimeter edge 164 of panel opening 156. Reflector 100 is placed over panel opening 156 above panel 20, thereby covering refractor 102, with second wall 134 of outer shoulder 130 resting on panel upper surface 160. Light source 18 extends through panel opening 156 and below panel 20. Refractor 102 encloses light source 18 from below and allows light to emanate therefrom. Second wall 134 of reflector outer shoulder 130 is spaced from refractor outer edge 142. Gasket 144 is disposed between reflector shoulder first wall 132 and refractor outer edge 142 to provide a seal therebetween.

Securing fasteners 158 are used to secure optical assembly 14 with respect to panel 20. In particular, each fastener 158 is inserted through panel 20 and through reflector shoulder first wall 132, as seen in FIGS. 2 and 3. This secures reflector 100 to panel 20 and in turn secures refractor 102 which is sandwiched between reflector 100 and panel 20. Thus, once optical assembly 14 is mounted to panel 20, optical assembly 14 is substantially restricted from moving with respect to panel 20. Also, reflector 100 acts as a support for socket holder 12 including socket 16 and light source 18. This eliminates the need for an additional part to support socket 16 and light source 18. A conventional ballast (not shown) is preferably remotely located such as on the panel upper surface 160. However, the ballast does not have to be remotely located. For example, the ballast can be placed closed to socket holder 12 by any type of known support member. Wires 166 (see FIG. 4) electrically connect socket 16 and the ballast.

In retrofit applications, panel 20 with luminaire 10 mounted thereon as described above, is itself mounted to a canopy or ceiling 160 in the same manner as described in U.S. Pat. Nos. 6,276,818 and 6,182,848 and therefore is not described in detail. In general, panel 20 with luminaire 10 mounted thereto is inserted into a canopy or ceiling opening 168 (see FIGS. 2 and 3), typically after an existing luminaire has been removed. Hinges 152 engage the canopy and allow panel 20 to pivot with respect to the canopy. Latches 154 secure panel 20 and luminaire 10 in the canopy when the panel 20 is pivoted up into the canopy or ceiling opening 168. Either the ballast from the pre-existing luminaire or a new ballast can be connected to socket 16 of luminaire 10 by wires 166. In new installation applications, luminaire 10 is simply mounted to support panel 20 as described above.

Embodiment of FIGS. 11–14

Figure 11:
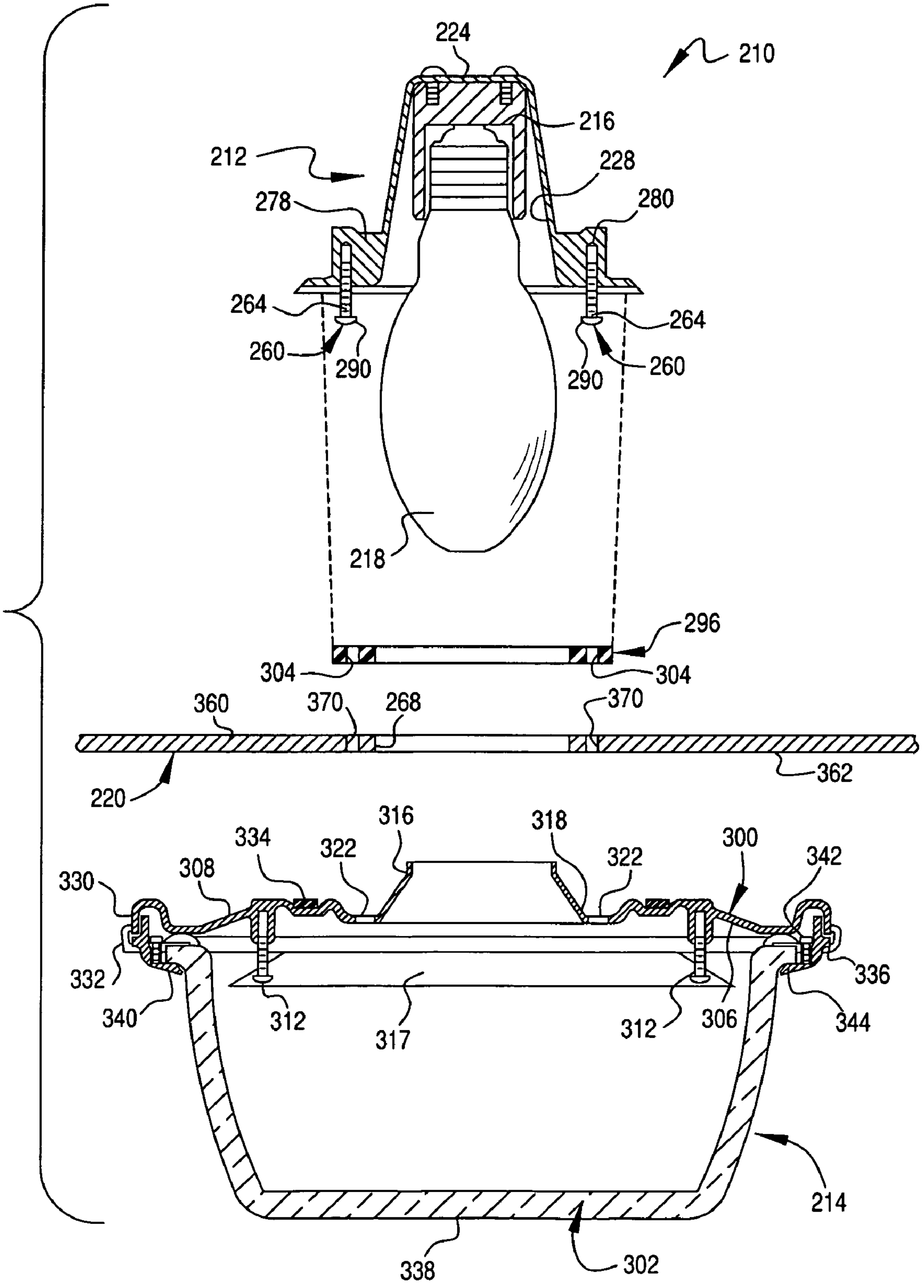
FIG. 11 is an exploded elevational side view of a luminaire in accordance with a second embodiment of the present invention, showing a socket holder, optical assembly and support panel.
Figure 12:
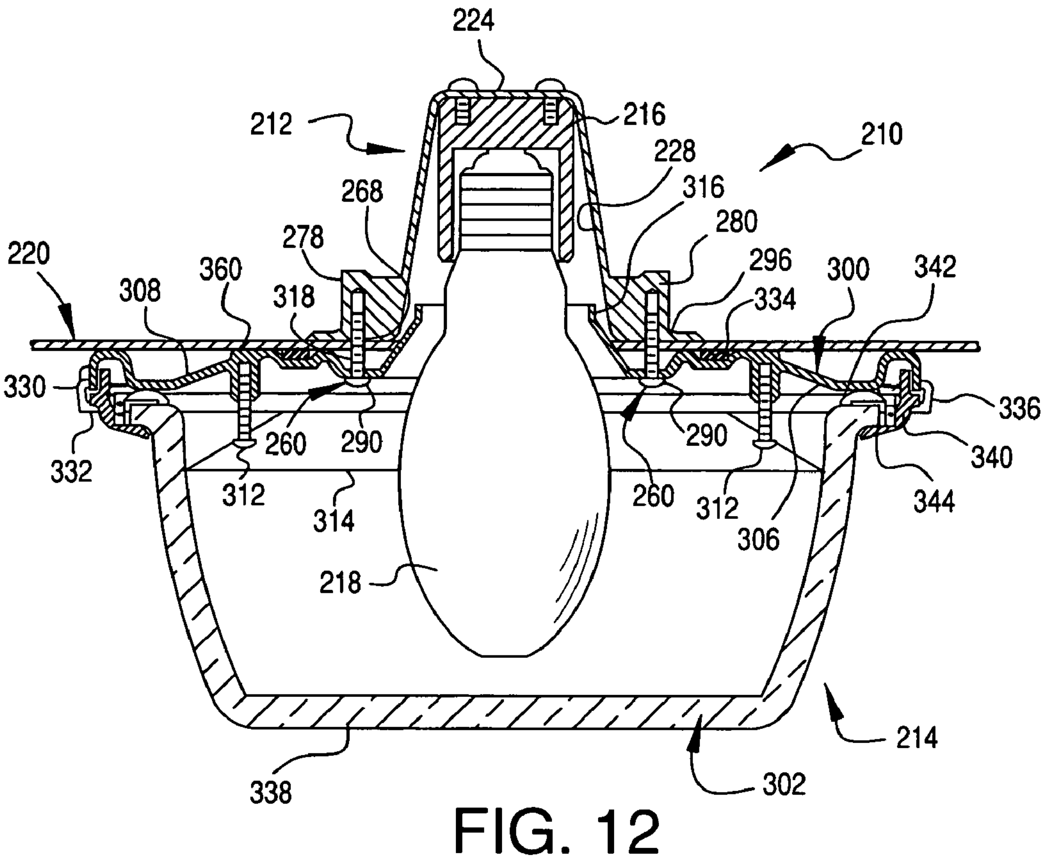
FIG. 12 is an elevational side view taken in section of the assembled luminaire illustrated in FIG. 11, showing a light source of the luminaire in a first orientation.
Figure 13:
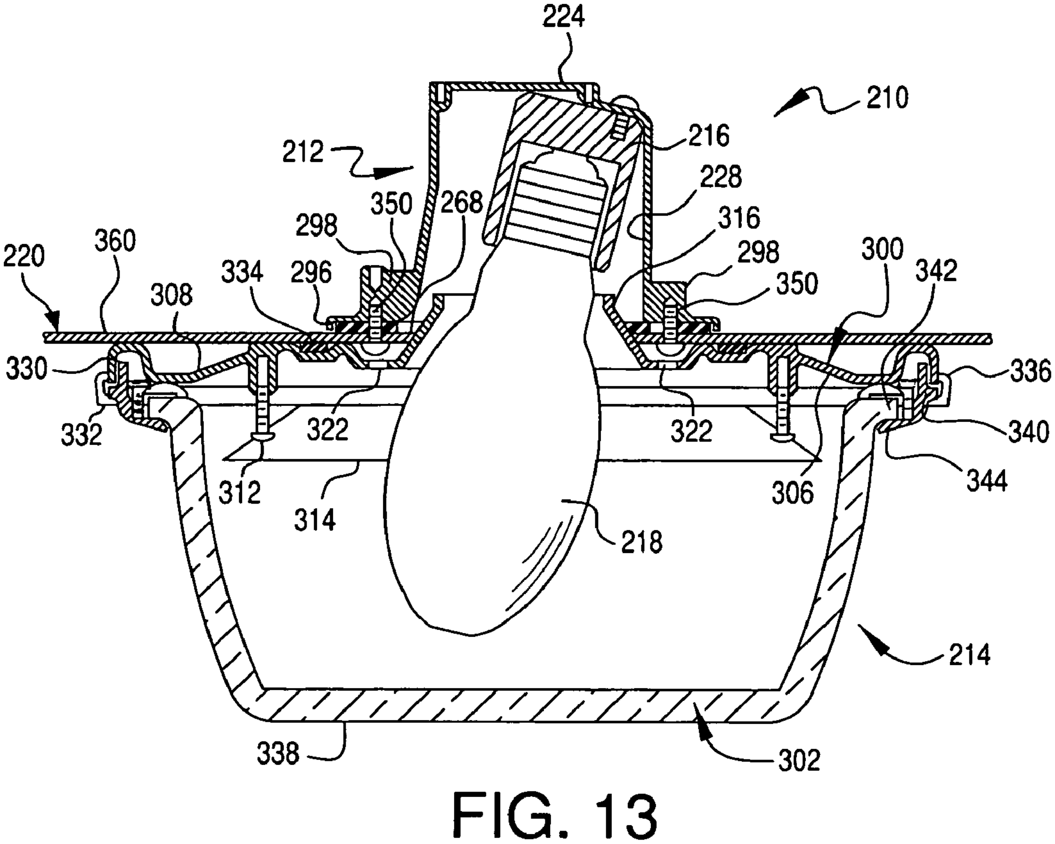
FIG. 13 is an elevational side view taken in section traverse to the sectional view of the assembled luminaire illustrated in FIG. 12, showing the light source of the luminaire in a second orientation.

Referring to FIGS. 11–14, a luminaire 210 in accordance with a second embodiment of the invention generally includes a socket holder 212 secured to a support panel 220 and an optical assembly 214 releasably coupled to socket holder 212. Support panel 220 can be either a retrofit panel for attachment to a canopy or ceiling or can be the canopy or ceiling itself. Socket holder 212 supports a socket 216 and a light source 218. Socket holder 212 can support light source 218 in more than one orientation, as seen in FIGS. 12 and 13, allowing selection of a desired orientation. Optical assembly 214 encloses light source 218 and allows light rays to emanate therefrom.

Socket holder 212 is substantially identical to socket holder 12 of the first embodiment and therefore the reference numerals used to describe socket holder 212 are the same as the reference numerals for socket holder 12 with the numeral 2 added to the front. Gasket 296 differs from gasket 96 of the first embodiment in that it is wider and includes openings 304, see FIG. 11, that allow mounting members or bolts 260 to extend through gasket 296. Socket holder 212 includes mounting members 260 that are mounting bolts 264 each with a bolt head 290. Two mounting members 260 do not include a guide portion like guide portion 62 of the first embodiment. Each mounting bolt 264 is threaded into a portion of respective receiving wells 278 and 280 leaving a substantially part of each mounting bolt 264 exposed under socket holder 212 for easy engagement with optical assembly 214.

Figure 14:
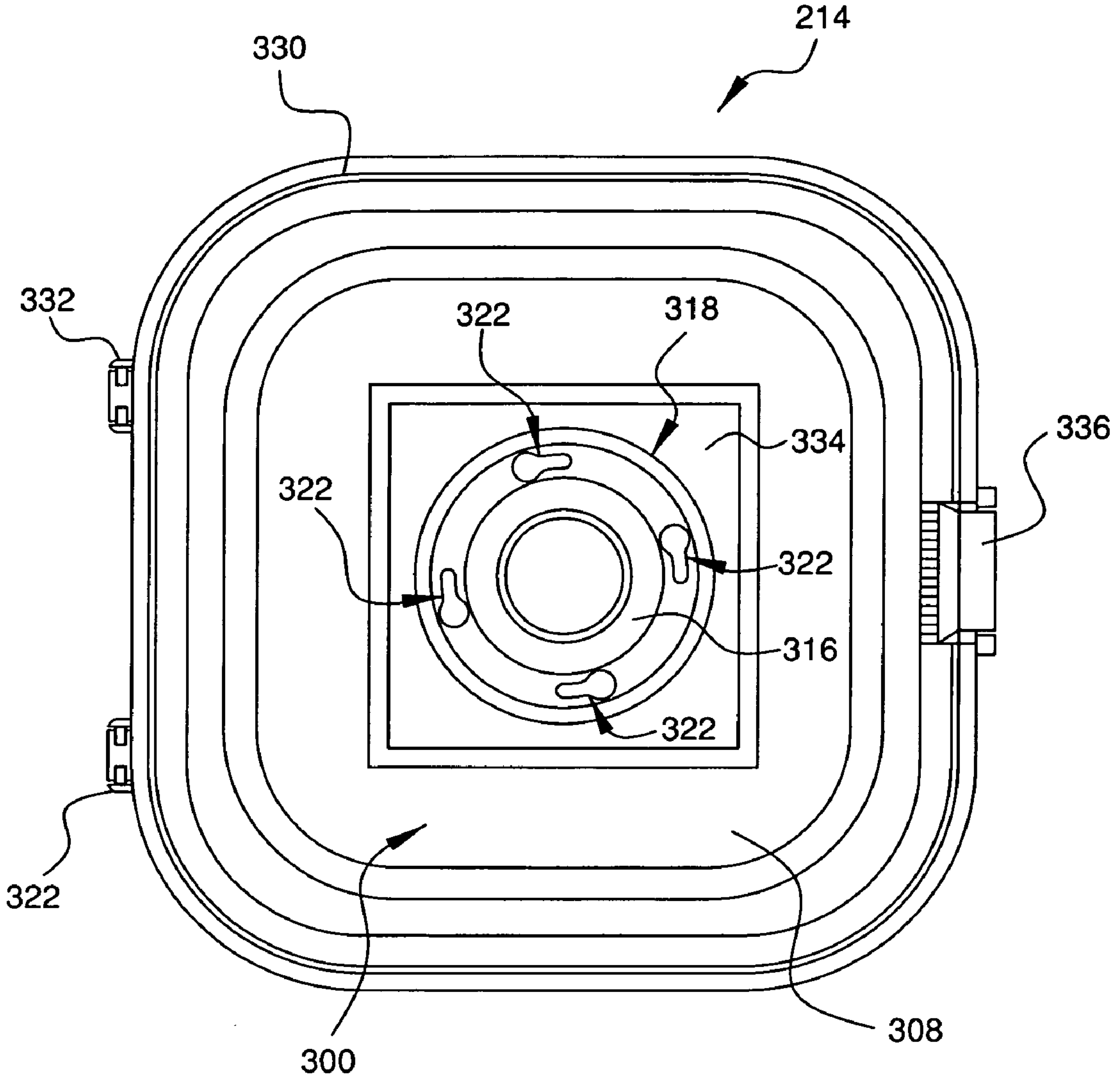
FIG. 14 is a top plan view of the optical assembly of the luminaire illustrated in FIG. 1.

Optical assembly 214 is substantially similar to the optical assembly disclosed in U.S. Pat. No. 6,394,628 to Wang and entitled Ballast Housing For Luminaire, the subject matter of which is herein incorporated by reference, and is therefore described only in sufficient to understand the present invention. In general, optical assembly 214 includes a mounting casting 300 coupled to a refractor 302. Inner surface 306 of mounting member 306 includes a reflective coating so that mounting member 300 acts a reflector. Mounting casting 300 includes a central mounting interface 318 including a mounting cone 316 and mounting apertures or key holes 322, as best seen in FIG. 14. Key holes 322 are substantially identical to key holes 122 of the first embodiment.

A second gasket 334 is generally square shaped with a central hole and rests on the upper surface 308 of mounting casting 300 surrounding key holes 322, as seen in FIG. 14. Mounting casting 300 includes an outer perimeter shoulder 330 adapted to engage refractor 302 by hinges 332 and latch 336 (see FIG. 14.), as described in U.S. Pat. No. 6,394,628. Extending from the inner or lower surface 306 of mounting casting 300 are optional fasteners 312 for supporting a reflector 314.

Refractor 302 is preferably a bowl shaped glass lens with a flat bottom 338 and includes a frame 340 that is attached to and disposed around an upper outer edge 342 of refractor 302. As with refractor 102 of the first embodiment, refractor 302 can be a variety of shapes as desired. Frame 340 is adapted for engaging reflector outer shoulder 330 via hinges 332 and latch 336. A third ring gasket 344 is disposed around refractor outer edge 342 between frame 340 and refractor 302 thereby creating a seal between refractor 102 and frame 340.

Support panel 220 includes upper and lower surfaces 360 and 362 and an opening 368 for mounting luminaire 210. Disposed concentrically around panel opening 368 are preferably four mounting holes 370 (see FIG. 11 showing two mounting holes 370).

Assembly of Embodiment of FIGS. 11–14

Assembly of luminaire 210 initially requires assembly of mounting members 260 with receiving wells 278 and 280 of socket holder 212 by threading each mounting bolt 264 into a respective receiving well 278 and 280 and leaving a substantial part of each bolt 254 exposed, as best seen in FIG. 11. Additionally, mounting bolts 264 of each mounting member 260 are also inserted through openings 304 of gasket 296 with gasket 296 being located between socket holder flange 252 and the mounting bolt heads 290 of bolts 264. Socket 216 and light source 218 are secured to socket holder 212 first end 224 in either the first or second orientation as described above with respect to the first embodiment.

Socket holder 212 is then secured to the upper surface 360 of panel 220 by fasteners 350, as seen in FIG. 13. In particular, socket holder 212 is placed over panel opening 368 so that gasket 296 of socket holder 212 is disposed on panel upper surface 360 around panel opening 368 and socket holder flange 252 also extends around panel 368. Preferably two fasteners 350 are inserted through two of the panel mounting holes 370, respectively, and threaded into secondary receiving wells 298 of socket holder 212 thereby securing socket holder 212 to panel 220, as seen in FIG. 13. At the same time, mounting bolts 264 of mounting members 260 are inserted through the remaining two panel openings 270, as seen in FIG. 12, as extend below panel 220. Light source 218, whether in the first or second orientation extends through panel opening 268. A conventional ballast, starter and capacitor (not shown) are preferably located on panel upper surface 360 and electrically connected to socket 216 by wiring.

With socket holder 212 secured in place on panel 220, optical assembly 214 is mounted to socket holder 212 by engaging mounting members 260 with mounting interface 318 of mounting casting 300. Specifically, optical assembly 214 is lifted so that mounting bolt heads 290 of mounting members 260 extend through key holes 322 of mounting casting 300. Also, mounting cone 316 of mounting casting 300 extends into inner receiving are 228 of socket holder 212 to facilitate proper positioning of optical assembly 214 with respect to socket holder 212. Optical assembly 214 is rotated, such as clockwise, to lock mounting bolt heads 290 with respect to key holes 322, in the same manner as described above except no guide portions are used with mounting members 260. Also the engagement of mounting members 260 and key holes 322 is the same as described regarding similar mounting mechanisms in U.S. Pat. No. 6,394,628. To remove optical assembly 214, the assembly 214 is rotated in the opposite direction, such as clockwise.

Although using a mounting bolt 264 and key hole 322 engagement is preferable to secure optical assembly to socket holder 212. This allows for a variety of optical assemblies to be mounted to socket holder 212 as long as they include key holes for engagement with mounting members 260 of socket holder 212. However, any known securing or mounting mechanism can be used. For example, fasteners that extend through mounting casting 300, panel 220 and socket holder flange 252 can be used to fixed optical assembly 214 with respect to panel 220 and socket holder 212. Alternatively, brackets or clips can be used to connect optical assembly to either socket holder 212 or panel 220 or both.

Although it is preferably two employ two mounting members 260 and two fasteners 350 with socket holder 212, any number of mounting members 260 or fasteners 350 can be used and only one mounting member 260 and one fastener 350 is required. Similarly, any number of key holes 322 can be used and only one key hole 322 is required.

If panel 220 is a retrofit panel to be used in retrofitting or replacing an existing luminaire, panel 220 and luminaire 210 mounted thereon would be mounted to an existing canopy or ceiling in the same manner as described above with respect to the first embodiment.

Embodiment of FIGS. 15–28

Figure 15:
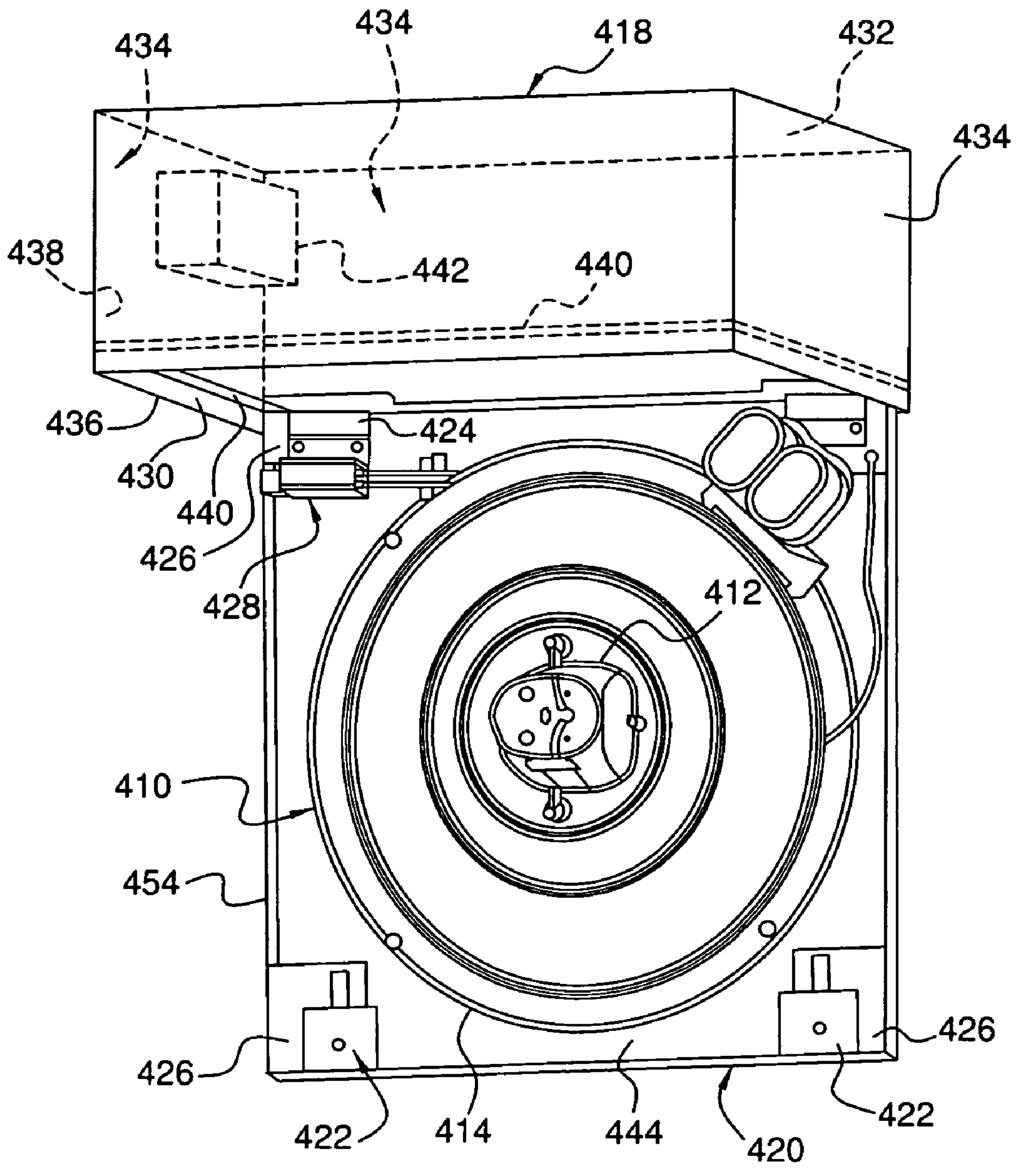
FIG. 15 is a perspective view of a luminaire and luminaire housing in accordance with a third embodiment of the present invention showing a panel supporting the luminaire and coupled to a host housing.

Referring to FIGS. 15–28, a luminaire 410 in accordance with a third embodiment of the present invention includes a socket holder 412 coupled to an optical assembly 414 that are supported in a host housing 418. Housing 418 is preferably mounted to a ceiling or canopy but can be mounted to any support, such as a pole. Socket holder 412 and optical assembly 414 are the same as socket holder 12 and optical assembly 14, respectively, of the first embodiment and therefore will not be described in further detail. Socket holder 412 and optical assembly 414 are supported by a support panel 420 that is engagable with host housing 418, as seen in FIG. 15. Panel 420 can also be mounted in a ceiling or canopy by engaging a grid or frame of the ceiling/canopy. Panel 420 includes latches 422 that allow panel 420 to be releasably latched to housing 418 and hinges 424 which allow panel 420 to pivotally move between open and closed positions with respect to housing 418. Latches 422 and hinges 424 are supported on secondary walls 426 of panel 420 which hide the latches 422 and hinges 424 from view. A switch assembly 428 is disposed on panel 420 and provides a safety mechanism against electrical shock when changing or operating the lamp of luminaire 410.

As seen in FIG. 15, housing 418 is substantially identical to the housing disclosed in commonly assigned U.S. Pat. Nos. 6,276,818 and 6,182,848 and therefore will not be described in detail. In general, housing 418 is preferably box shaped with one open side 430 for accommodating panel 420. Housing 418 includes a base wall 432 and four depending side walls 434 which each terminate at a free edge 436. The open side 430 of housing 418 is located at the free edges 436 of side walls 434. Extending from the inner surfaces 438 of each side wall 434 is a frame or flange 440 for engaging latches 422 and hinges 424 of panel 420. Disposed within housing 420 is a conventional ballast 442 for powering and operating luminaire 410, as seen in FIG. 15. Ballast 442 can be located on any wall of housing 418 or remote from housing 418 such as on a ceiling or canopy on which housing 418 is mounted. Also, ballast 442 is not required if incandescent lamp is used with luminaire 410.

Figure 16:
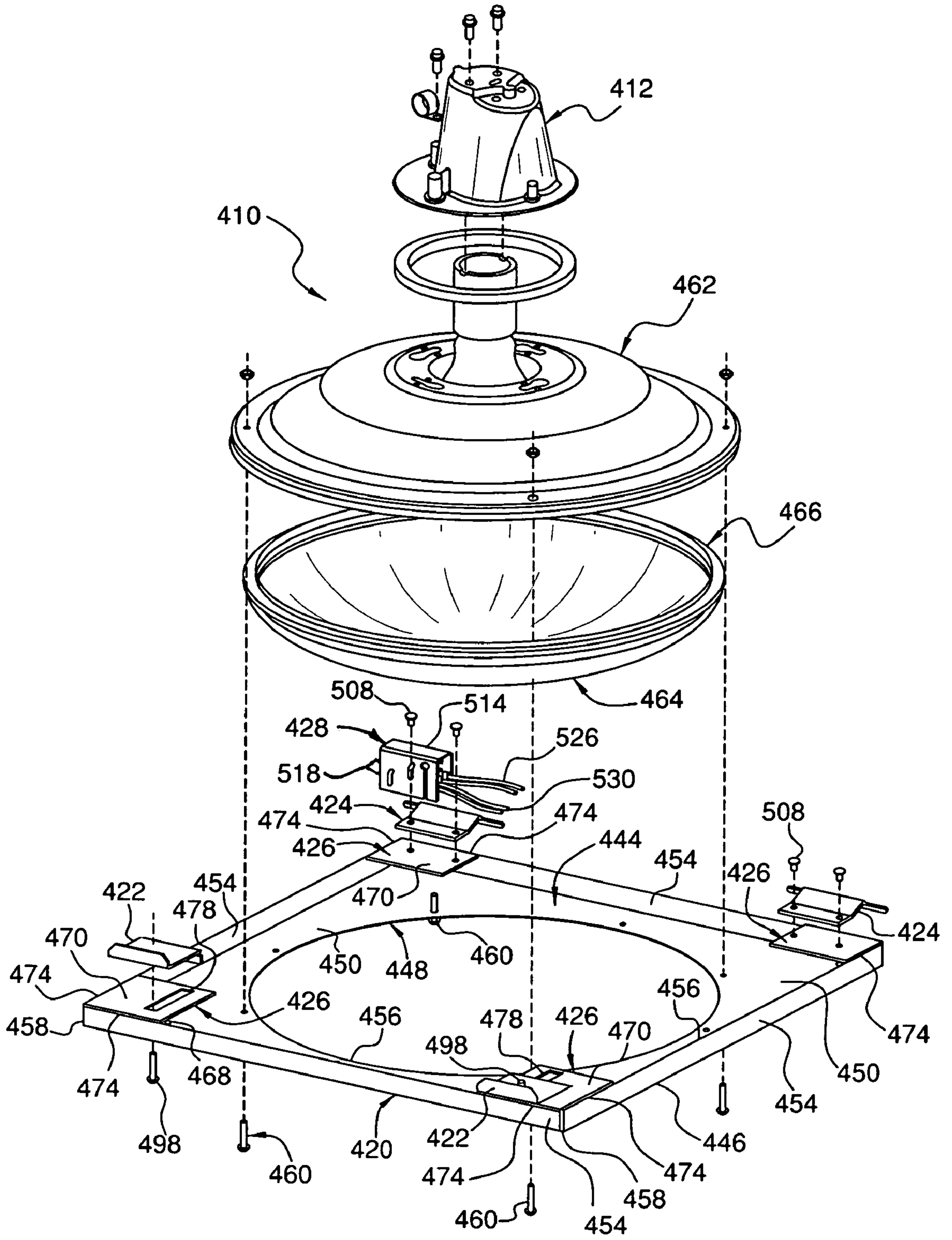
FIG. 16 is an exploded perspective view of the luminaire and panel illustrated in FIG. 15.

As seen in FIGS. 15 and 16, support panel 420 generally includes a main wall 444 that has an outer perimeter 446 and a central opening 448 for receiving optical assembly 414 in the same manner that central opening 156 of panel 20 receives optical assembly 14 of the first embodiment. Fasteners 460 secure the reflector 462, lens 464 and gasket 466 of optical assembly 414 to panel 420 in the same manner as fasteners 158 secure reflector 100, lens 102 and gasket 144 to panel 20 of the first embodiment.

Main wall 444 includes opposite first and second surfaces 450 and 452. A plurality of side walls 454 extend from first surface 450 at the outer perimeter 446 of main wall 444, as seen in FIG. 16. Although, it is preferable that four side walls 454 be employed, any number of side walls can be used or only a single side wall can be used. Each side wall 454 includes a free edge 456 opposite main wall 444. Corners 458 are formed at the junction of side walls 454.

Secondary walls 426 extend from side walls 454 at free edges 456 toward central opening 448 of main wall 444 and optical assembly 414 so that each secondary wall 426 extends over a portion of first surface 450 of main wall 444, as seen in FIGS. 15 and 16. Secondary walls 426 support latches 422 and hinges 424. Although it is preferable to employ four secondary walls 426, only one secondary walls 426 that supports a single latch 422 or a single hinge 424, is necessary. In that case, a second latch 422 or hinge 424 could be added to main wall 444. Alternatively, two secondary walls 426 can be employed with each supporting a single latch 422 or hinge 424, respectively.

Figure 18:
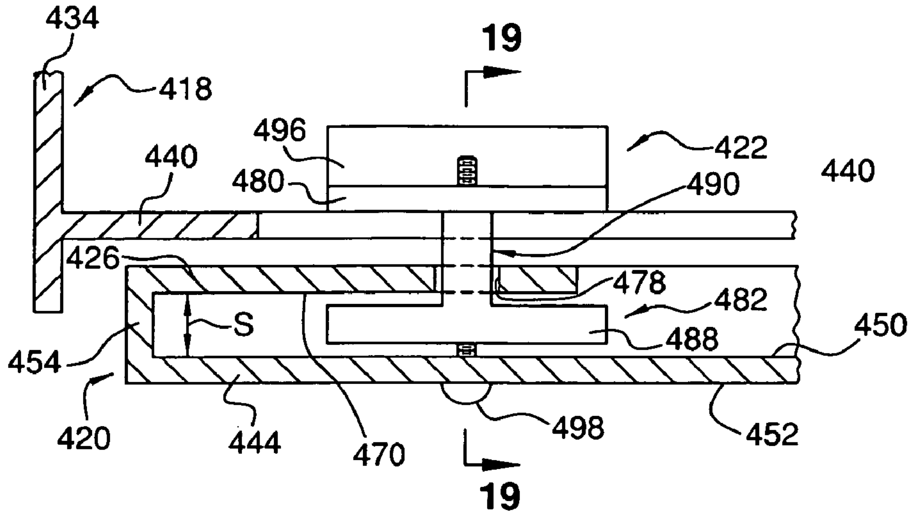
FIG. 18 is a partial front elevational view in section of the host housing and the panel illustrated in FIGS. 15 and 16, showing the latch and panel in a latched and closed position with respect to the housing.
Figure 23:
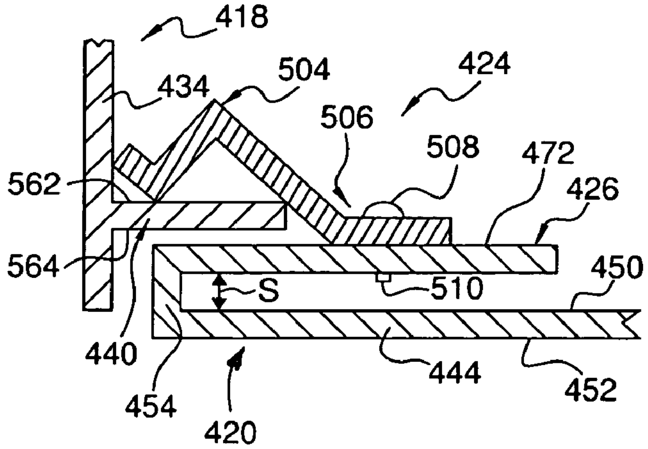
FIG. 23 is a partial side elevational view of the host housing and the panel similar to that of FIG. 22, showing the hinge and the panel in a closed position with respect to the housing.

Each secondary wall 426 is preferably substantially square in shape with one secondary wall 426 being disposed in each corner 458 between side walls 454, as seen in FIG. 16. However, each secondary wall 426 can be any desired shape including any polygonal shape such as a rectangle or triangle or any curved shape such as a segment or semi-circle shape. Each secondary wall 426 is substantially planar with a first surface 470 facing first surface 450 of main wall 444 and a second surface 472 that is opposite first surface 470. A space S is defined between the first surface 470 of secondary wall 426 and the first surface 450 of main wall 444, as best seen in FIGS. 18 and 23, for hiding latches 422 and hinges 424 and any hardware used therewith. Each secondary wall 426 includes four sides 474 with two of the sides 474 being attached to side walls 454 at a corner 458 and the other two sides 476 being free from attachment. Although it is preferable that sides 474 of secondary walls are attached to side walls 454 at corners 458, secondary walls 426 can be attached to any portion of side walls 454 and/or only one side 474 of each secondary wall can be attached to a side wall 454.

Figure 17:
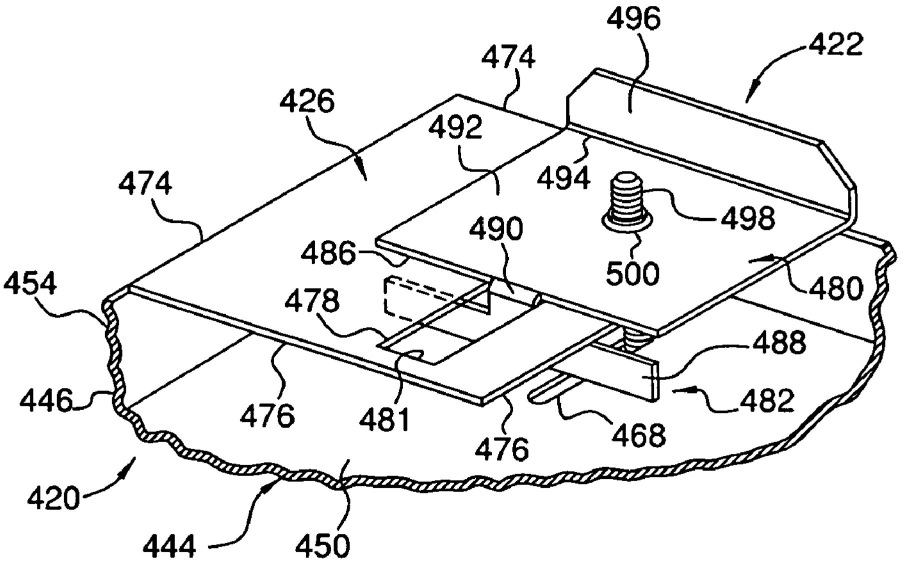
FIG. 17 is a partial perspective view of the panel illustrated in FIGS. 15 and 16, showing a secondary wall of the panel supporting a latch.
Figure 19:
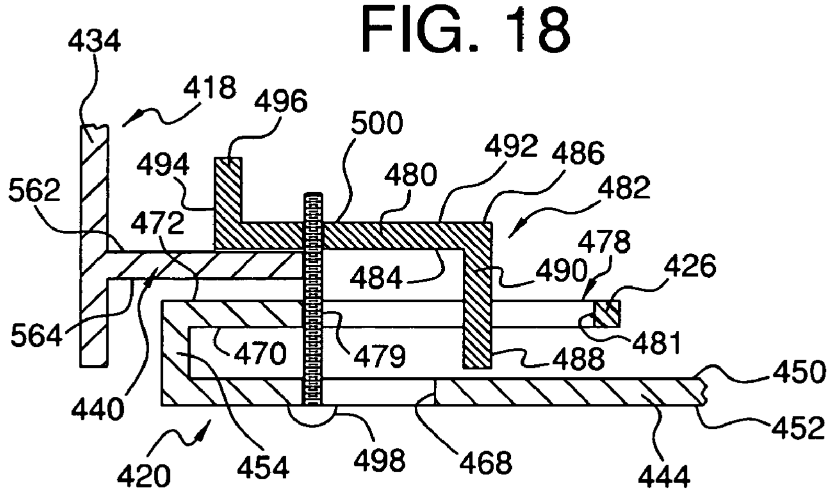
FIG. 19 is a partial side elevational view of the host housing and panel taken in section along line 19—19 of FIG. 18, showing the latch and panel in a latched and closed position with respect to the housing.
Figure 20:
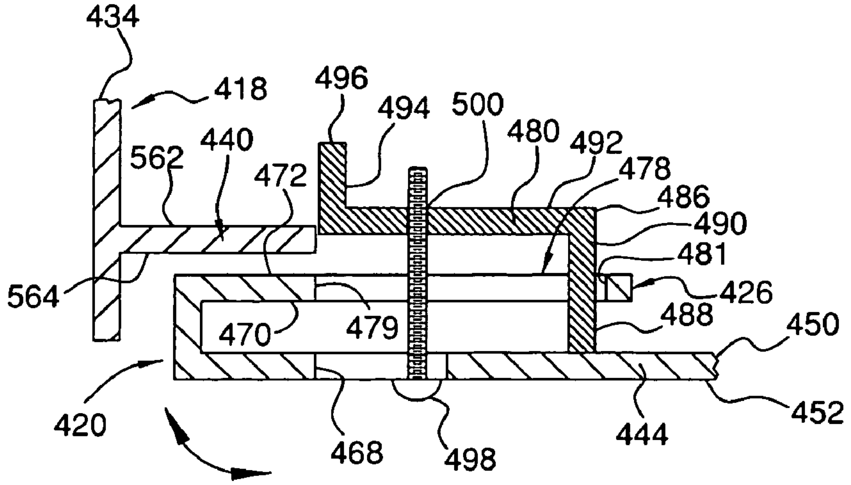
FIG. 20 is a partial side elevational view of the host housing and the panel similar to that of FIG. 19, showing the latch and panel in an unlatched and open position with respect to the housing.
Figure 21:
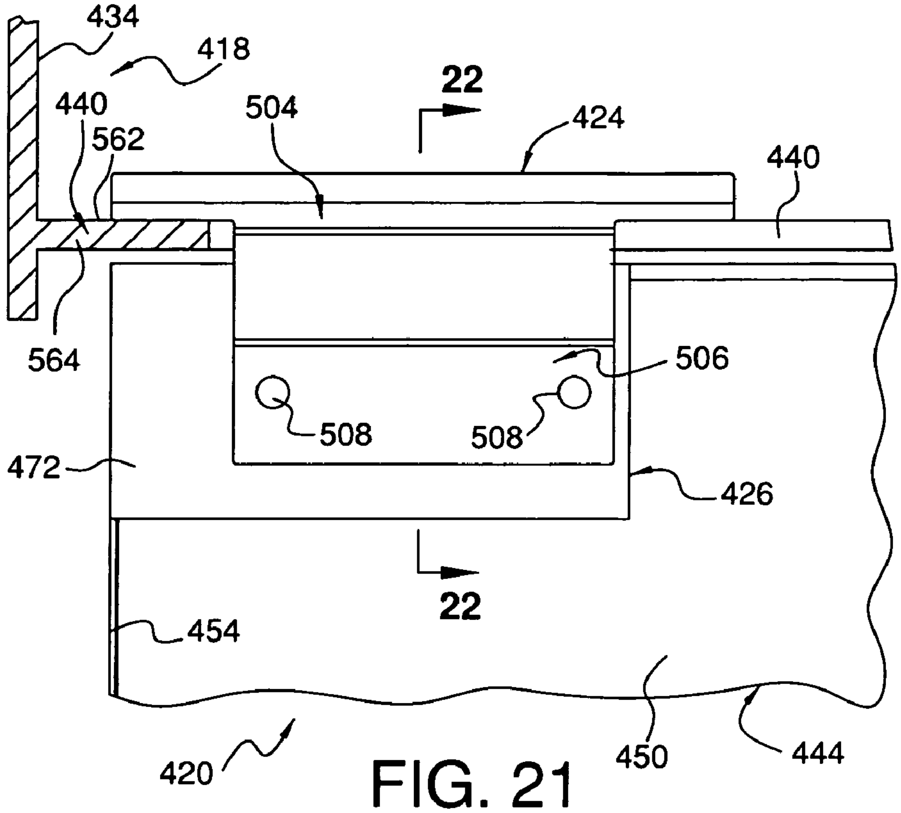
FIG. 21 is a partial front elevational view of the host housing in section and the panel illustrated in FIGS. 15 and 16, showing a hinge and the panel in an open position with respect to the housing.

As seen in FIGS. 16–20, two of secondary walls 426 support first and second latches 422, respectively. Preferably the two secondary walls 426 that support latches 422 are attached to a common side wall 454 of panel 420, as best seen in FIG. 16. Each of the two secondary walls 426 include an elongated guide slot 478 for receiving a portion of each latch 422. Elongated slot 478 extends between one of the attached sides 474 of secondary wall 426 and one of the free sides 476 and includes first and second ends 479 and 481. Elongated slot 478 is generally aligned with a corresponding slot 468 in main wall 444, as best seen in FIGS. 17, 19 and 20. Since each latch 422 is identical, only one latch 422 will be described with respect to one secondary wall 426. Although it is preferable to employ more than one latch 422, only a single latch 422 is necessary.

Latch 422 includes a latching plate 480 and a coupling extension 482 for coupling latching plate 480 to the secondary wall 426 supporting latch 422. Latching plate 480 is substantially square but can be any polygonal or circular shape. Coupling extension 482 extends from a first surface 484 of latching plate 480 at a first end 486 thereof and preferably includes a flange portion 488 with a extension portion 490 extending between flange 488 and first end 486. Flange portion 488 and extension portion 490 are substantially coplanar, substantially perpendicular to latching plate 480 and form a substantially T-shaped member. Extension portion 490 has a width that is slightly less than the width of elongated slot 478, as best seen in FIG. 17. Flange portion 488 preferably has a length slightly less than the length of elongated slot 478. However, the length of flange portion 488 can range between slightly less than the length of slot 478 to slightly greater than the width of slot 478. Coupling extension 482 is slidable between first and second ends 479 and 481 of elongated guide slot 478 to move latching plate 480 between latched and unlatched positions. Coupling extension 482 is allowed to extend into the space S between the respective secondary wall 426 and main wall 444, thereby hiding coupling extension 482 from view when panel 420 is closed with respect to host housing 418 and frame 440, as seen in FIG. 19.

Extending from a second surface 492 opposite first surface 484 at a second opposite end 494 is a second extension or flange 496, as seen in FIGS. 17–20. Second flange 496 is preferably substantially perpendicular to latching plate 480. Although it is preferable to include second flange 496 with latching plate 480, flange 494 can be eliminated so that no structure extends from the second end 494 of latching plate 480.

An actuating member 498 extends through slot 468 of panel main wall 444 and through elongated guide slot 478 of the secondary wall 426 supporting latch 422 and engages a threaded aperture 500 of latching plate 480, as best seen in FIGS. 17, 19 and 20. Actuating member 498 is preferably a fastener, such as a screw and provides a handle for operatively moving latch 422. Since extension portion 490 of latching plate 480 has a width that is only slightly less than the width of elongated guide slot 478 and has substantially the same shape in cross-section, e.g. rectangular, as guide slot 478, latching plate 480 will not rotate with actuating member 498 when member 498 is threaded into aperture 500 of latching plate 480 because the edges of extension portion 490 will abut the edges of slot 478.

As seen in FIGS. 16 and 21–23, the other two secondary walls 426 support first and second hinges 424. Preferably the two secondary walls 426 that support hinges 424 are attached to a common side wall 454 of panel 420. Each hinge 426 is the same as hinges 152 of the first embodiment which are the same as the hinges disclosed in U.S. Pat. Nos. 6,276,818 and 6,182,848 and therefore will not be described in detail. In general, each hinge 426 includes a first section 504 that pivotally engages frame 440 of host housing 418 and a second section 506 that attaches to the second surface 472 of respective secondary walls 426. Fasteners 508 extend through second section 506 and the secondary wall 426, thereby securing hinge 424 to the secondary wall 426. The ends 510 of fasteners 508 are allowed to extend into the space S between secondary wall 426 and main wall 444 and are thus hidden from view when panel 420 is closed, as seen in FIG. 23. Although it is preferable to use two hinges 424, only a single hinge 422 is necessary.

As seen in FIGS. 16 and 24–28, switch assembly 428 is disposed on one of secondary walls 426. In particular, switch assembly 428 is preferably disposed on one of the hinges 424 so that the hinge 424 is located between switch assembly 428 and secondary wall 426. Switch assembly 428 provides a safety mechanism for interrupting power to socket holder 412 and optical assembly 414 of luminaire 410 upon opening panel 420 with respect to host housing 418. In general, switch assembly 428 includes a switch housing 514 that receives an electrical switch 516 and a lever 518 for actuating electrical switch 516.

Figure 25:
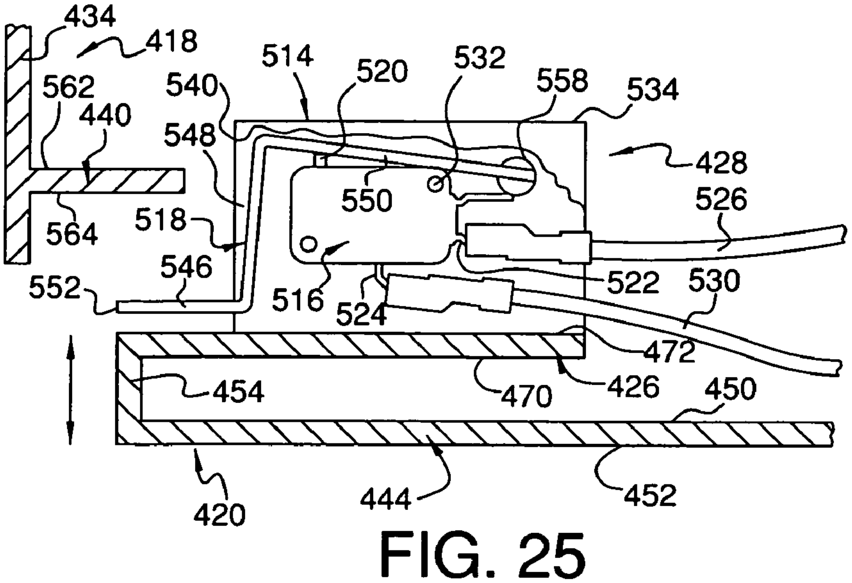
FIG. 25 is a partial side elevational view in section of the host housing and panel illustrated in FIGS. 15 and 16, showing panel in an open position and the switch assembly in a open position with power being interrupted.
Figure 27:
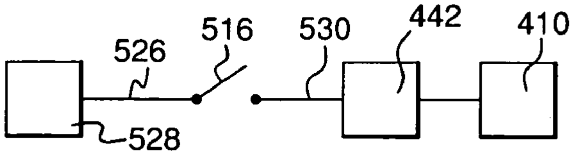
FIG. 27 is a diagrammatic view of the electrical connection between a power source, an electrical switch, a ballast and the luminaire illustrated in FIGS. 15 and 16, showing the electrical switch in an open position with the power being interrupted.
Figure 28:
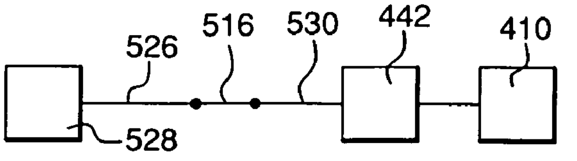
FIG. 28 is a diagrammatic view similar to FIG. 27, showing the electrical switch in a closed position with the power being uninterrupted.

Electrical switch 516 is any conventional electrical switch, such as the V7-3E11E9 made by Honeywell, and includes a spring loaded actuator button 520 and electrically connected input and output leads 522 and 524. Connected to input lead 522 are electrical wires 526 which are connected to a power source 528 (FIGS. 27 and 28). Connected to output lead 524 are electrical wires 530 which are connected to ballast 442. Actuator button 520 is biased in an open position where the electrical connection between input and output leads 522 and 524 is interrupted thus ceasing power to ballast 442 and luminaire 410, as seen in FIGS. 25 and 27.

Figure 24:
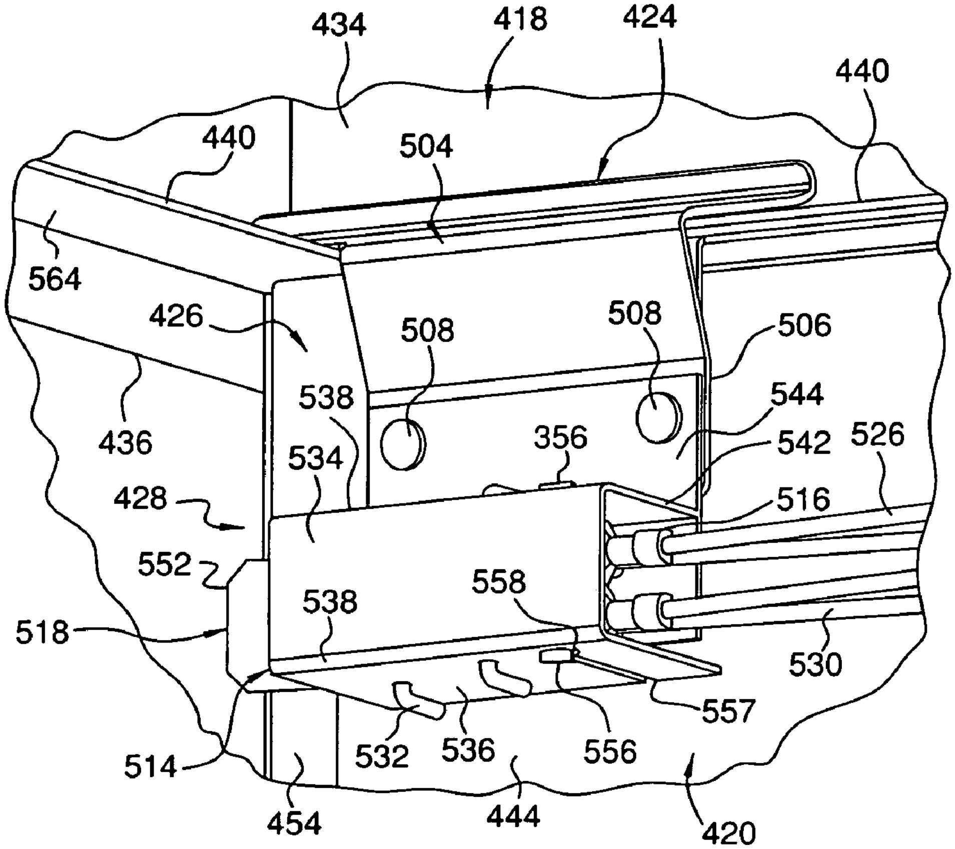
FIG. 24 is a partial perspective view of the host housing and the panel illustrated in FIGS. 15 and 16, showing the hinge and panel in an open position with a switch assembly secured to the hinge and panel.

Electrical switch 516 is received within switch housing 514 and is secured thereto by pins 532 such that switch 516 is suspended within housing 514. Switch housing 514 includes a cover wall 534 with two depending walls 536 extending from opposing side edges 538 of cover wall 534. Electrical wires 526 and 530 can extend into and out of housing 514 through first and second open ends 540 and 542 between cover wall 534 and depending walls 536. A securing flange 544 extends from one of the depending walls 536 remote from cover wall 534 and is attachable to hinge second section 506. Preferably, fasteners 508 extend through both switch housing flange 544 and hinge second section 506 and through the respective secondary wall 426, thereby securing switch assembly 428 and hinge 422 to the secondary wall 426, as seen in FIG. 24.

Figure 26:
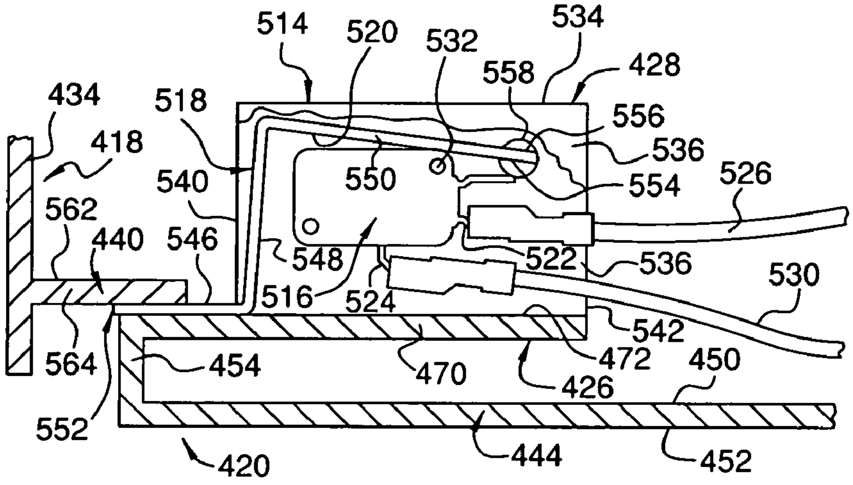
FIG. 26 is a partial side elevational view in section of the host housing and panel similar to FIG. 25, showing the panel in a closed position and the switch assembly in a closed position with the power being uninterrupted.

Lever 518 includes first, second and third portions 546, 548, 550 and first and second opposing ends 552 and 554. Second portion 548 is located between first and third portions 546 and 550 and is substantially perpendicular to first and third portions 546 and 550, as seen in FIGS. 25 and 26. First end 552 is engagable with frame 440 and second portion is pivotally engagable switch housing 514. First portion 546 extends through first open end 540 of switch housing 514 so that first end 552 extends outside of switch housing 514. Extension portions 556 extend laterally outwardly from third portion 550 near second end 554 and pivotally engage corresponding apertures 558 in switch housing depending walls 536, as seen in FIGS. 24–26. The pivotal engagement of lever third portion 550 and switch housing 514 is spaced from electrical switch 516 so that lever third portion 550 rests on actuating button 520, as seen in FIGS. 25 and 26. Additionally, one of the depending walls 536 includes a vertical slot 557 connected to pivot aperture 558 of that depending wall 536, as seen in FIG. 25. Vertical slot 557 facilitates assembly of lever 518 and switch housing 514.

Assembly and Operation of Embodiment of FIGS. 15–28

Referring to FIGS. 15–28, socket holder 412 and optical assembly 414 of luminaire 410 are assembled in the same manner as socket holder 12 and optical assembly 14 of luminaire 10 of the first embodiment. Similarly, socket holder 412 and optical assembly 414 of luminaire 410 are mounted to panel 420 in the same manner as luminaire 10 is mounted to panel 20 of the first embodiment. Each latch 422 is assembled with a respective secondary wall 426 of panel 420. The assembly of only one latch 422 with one respective secondary wall 426 will be described since the assembly is the same for both latches 422. Initially latch 422 is rotated so that coupling extension 482 is aligned with elongated guide slot 478 of the secondary wall 426. Since the length of flange 488 of coupling extension 482 is less than the length of guide slot 478, coupling extension can then be inserted through guide slot 478 until latching plate 480 rests on secondary wall second surface 472. Latch 422 is then rotated a second time ninety degrees so that flange 488 of coupling extension 482 is substantially perpendicular to the length of guide slot 478, as best seen in FIGS. 17 and 18. In this position, latch 422 will not disassemble or disengage from secondary wall 426 because the length of flange 488 of coupling extension 482 is greater than the width of guide slot 478. Actuating member 498 is then inserted through slot 468 of panel main wall 444 and through guide slot 478 and threaded into latching plate 480 via threaded aperture 500. Extension 490 of latch 422 will prevent latching plate 480 from rotating when threaded actuating member 498 into latching plate aperture 500. If removal of latch 422 is desired, actuating member 498 is disengaged from latching plate 498, latch 422 is rotated until coupling extension 482 is aligned with guide slot 478 allowing flange 488 of coupling extension 482 to be pulled back through guide slot 478.

Figure 22:
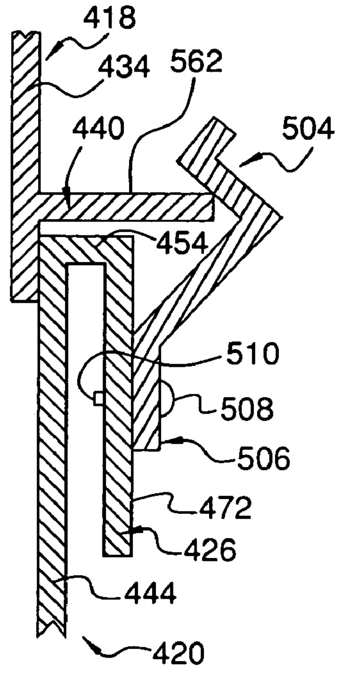
FIG. 22 is a partial side elevational view of the host housing and panel taken in section along line 22—22 of FIG. 21, showing the hinge and the panel in the open position with respect to the housing

Hinges 424 are attached to respective secondary walls 426 by extending fasteners 508 through the second sections 506 of each hinge 424 and through each secondary wall 426, as seen in FIGS. 22 and 23. Hinges 422 are positioned on respective secondary walls 426 such that hinge first portions 504 extend beyond panel side walls 454 to facilitate the pivotal engagement of hinges 422 and frame 440 of host housing 418.

Switch assembly 428 is preferably secured on top of one of hinges 424, as seen in FIGS. 16 and 24. Switch assembly 428 is first assembled by coupling lever 518 housing 514 by inserting extension portions 556 into pivot apertures 558 of housing 514. Since extension portions 556 are wider than switch housing 514, vertical slot 557 is provided to facilitate the engagement of portions 556 and housing 514. In particular, at least one extension portion 556 of lever 518 is aligned with and inserted into vertical slot 557 of housing 514 and is slid along vertical slot 557 until the extension portion 558 reaches pivot aperture 558. This allows the second extension portion 558 to be inserted into the second pivot aperture 558. The lever 518 can then rotated into an operative position, as seen in FIGS. 25 and 26. Vertical slot 557 also prevents lever 518 from being removed from housing 514 until lever member 518 is rotated back and one of the extension portions 556 is again aligned with vertical slot 557. Switch 516 is then secured to housing 514 by pins 532.

Switch housing 514 with electrical switch 516 secured therein is then placed over hinge second portion 506 so that switch 516 is located between cover wall 534 and hinge second portion 506, and lever first end 552 extends outside of switch housing 516 toward frame 440. Electrical wires 526 and 530 of switch 516 extend through switch housing second open end 542.

Panel 420 with socket holder 412 and optical assembly 414 of luminaire 410, latches 422, hinges 424 and switch assembly 428 secured thereto is mounted to host housing 418 in substantially the same manner as the panel and housing described in U.S. Pat. Nos. 6,276,818 and 6,182,848. Panel 420 is preferably retrofitted to an existing host housing 418. This allows the use of the existing ballast 442 with socket holder 412 and optical assembly 414 of luminaire 410 rather than requiring a new ballast. However, panel 420 and luminaire 410 can also be employed in a new installation application with a new ballast.

Initially, hinges 424 of panel 420 are pivotally engaged with frame 440 of host housing 418, as best seen in FIGS. 15 and 21–24. In particular, each hinge first section 504 is engaged with frame upper surface 562. This allows hinges 424 and panel 420 to pivot with respect to frame 440 between open and closed positions, as seen in FIGS. 22 and 23, respectively. In the closed position, hinges 424 and fasteners 508 will be hidden from view by panel main wall 444. Socket holder 412 and optical assembly 414 of luminaire 410 are electrically connected to ballast 442.

Latches 422 allow panel 420 to be latched to host housing 418 in the closed position as seen in FIGS. 18 and 19. Since latches 422 are identical, the latching and unlatching of panel 420 with frame 440 will be described with respect to only one latch 422. To latch panel 420, actuating member 498 is moved toward first end 479 of secondary wall guide slot 478 and simultaneously moved within main wall slot 468, thereby sliding latch 422 toward frame 440. The lower surface 484 of latching plate 480 slidably engages the upper surface 562 of frame 440 and actuating member 498 and latch 422 are moved toward frame 440, thereby latching panel 420 to frame 440, as seen in FIG. 19. In this position, latch 422 will be hidden from view expect for actuating member 498. To unlatch or release panel 420, actuating member 498 is moved in the opposite direction toward the second end 481 of secondary wall guide slot 478 until latching plate 480 of latch 422 is disengaged or spaced from frame 440, as seen in FIG. 20. In this position, coupling extension 482 will be adjacent to or abutting the second end 481 of secondary wall guide slot 478.

As seen in FIGS. 25–28, when unlatching panel 420 from frame 440 and host housing 418, switch assembly 428 interrupts power to socket holder 412 and optical assembly 414 of luminaire 410 to protect an operator of the luminaire against electrical shock. In particular, electrical switch 516 is in a normally open position with spring loaded actuating button 520 being biased such that the electrical connection is interrupted between input lead 522, that is connected to wires 526 of power source 528 (FIG. 27), and output lead 524, that is connected to wires 530 of ballast 442 (FIG. 27). This interrupts power coming from power source 526 to ballast 442 via electrical wires 526 and 530 which in turn powers luminaire 410, as seen in FIG. 27. Thus, when panel 420 is unlatched from frame 440, as seen in FIG. 25, power is cut off to luminaire 410. In this position lever 518 of switch assembly 514 rests on actuating button 520 and switch 516.

When latching panel 420 to frame 440 and host housing 418, power is returned to luminaire 410. Specifically, actuating button 520 is depressed by lever 518 thereby restoring the electrical connection between input and output leads 522 and 524 and restoring power to luminaire 410 via wires 526 and 530, as seen in FIG. 28. As panel 420 is moved to a closed position with respect to frame 440, first end 552 of lever 518, which extends outside of switch housing 514, is captured between the lower surface 564 of frame 440 and the upper surface 472 of secondary wall 426, as seen in FIG. 26. Substantially simultaneously, lever third portion 550 pivots about extension portions 556 and switch housing apertures 558 and lever second portion 548 abuts and depresses actuating button 520, thereby restoring the electrical connection between input and output leads 522 and 524. Open end 540 of switch housing 514 allows lever 518 to freely pivot.

While particular embodiments have been chosen to illustrate the invention, it will be understood by those skilled in the art that various changes and modifications can be made therein without departing from the scope of the invention as defined in the appended claims.

What is claimed is:

1. A luminaire retrofit panel, comprising:

a main wall adapted to support a luminaire in a central opening of said main wall, and including an outer perimeter;

a side wall extending directly and outwardly from said outer perimeter of said main wall; and a plurality of secondary walls extending from said side wall and extending over a portion of said main wall toward said central opening of said main wall with said secondary walls being substantially parallel to said main wall, said plurality of secondary walls supporting at least one hinge and at least one latch, whereby said hinge is engagable with a frame and allows said main wall to pivot with respect the frame, and said latch is engagable with the frame to hold said main wall to releasably secure said main wall to the frame.

2. A luminaire retrofit panel according to claim 1, wherein said side wall includes a plurality of side walls with each side wall having at least one of said plurality of said secondary walls extending therefrom.

3. A luminaire retrofit panel according to claim 2, wherein said side walls form at least one corner and at least one of said plurality of secondary walls is located at said corner.

4. A luminaire retrofit panel according to claim 2, wherein said plurality of side walls are four side walls forming four corners therebetween; and said plurality of secondary walls are four secondary walls with one of said four secondary walls extending from each of said respective corners, respectively.

5. A luminaire retrofit panel according to claim 4, wherein said hinge is a first hinge and is disposed on one of said secondary walls;

a second hinge is disposed on another of said secondary walls.

6. A luminaire retrofit panel according to claim 4, wherein said latch is a first latch and is disposed on one of said secondary walls remote from said hinge; and a second latch is disposed on another of said secondary walls.

7. A luminaire retrofit panel according to claim 1, wherein a portion of said hinge extends beyond said outer perimeter of said main wall.

8. A luminaire retrofit panel according to claim 1, wherein said hinge is a first hinge supported on one of said secondary walls; and a second hinge is supported on another of said secondary walls.

9. A luminaire retrofit panel according to claim 1, wherein said latch is a first latch and is disposed on one of said secondary walls remote from said hinge; and a second latch is disposed on another of said secondary walls.

10. A luminaire retrofit panel according to claim 1, wherein a switch assembly is disposed on one of said secondary walls, said switch assembly includes an electrical switch for turning power on and off to said luminaire.

11. A luminaire retrofit panel according to claim 1, wherein said luminaire includes a lens receiving in said central opening of said main wall and a reflector mounted to said main wall, said reflector and said lens enclose a light source of said luminaire.

12. A luminaire housing, comprising:

a frame; and a panel releasably coupled to said frame and movable between open and closed positions with respect to said frame, said panel having a main wall for supporting a luminaire and including a central opening, an outer perimeter, a side wall extending directly and outwardly from said outer perimeter of said main wall, and a plurality of secondary walls extending from said side wall and extending over a portion of said main wall toward said central opening, with said secondary walls being spaced from said main wall by said side wall, said plurality of secondary walls supporting at least one hinge and at least one latch, said hinge being supported by said main wall and pivotally engaged with said frame thereby allowing said panel to move between said open and closed positions, and said latch being engaged with said frame to hold said panel in said closed position and disengaged with said frame when said panel is in said open position.

13. A luminaire housing according to claim 12, wherein said central opening receives a lens of said luminaire.

14. A luminaire housing according to claim 12, wherein said frame includes a flange;

said hinge includes a portion that extends beyond said outer perimeter of said main wall and engages said flange.

15. A luminaire housing according to claim 12, wherein said side wall includes a plurality of side walls with each side wall having at least one of said plurality of secondary walls extending therefrom.

16. A luminaire housing according to claim 15, wherein said plurality of side walls are four side walls forming four corners therebetween; and said plurality of secondary walls are four secondary walls with one of said four secondary walls extending from each of said respective corners, respectively.

17. A luminaire housing according to claim 15, wherein said hinge is disposed on one of said secondary walls extending from one of said side walls; and said latch is disposed on another of said secondary walls extending from another of said side walls so that said latch is spaced from said hinge.

18. A luminaire housing according to claim 12, wherein a second hinge is supported on one of said secondary walls; and a second latch is supported on another of said secondary walls.

19. A luminaire housing according to claim 12, wherein a switch assembly is disposed on said hinge, said switch assembly includes an electrical switch for turning power on and off to said luminaire.

20. A luminaire housing, comprising:

a frame; and a panel releasably coupled to said frame and movable between open and closed positions with respect to said frame, said panel having a main wall for supporting a luminaire and including an outer perimeter, a side wall extending from said outer perimeter of said main wall, at least one secondary wall extending from said side wall and over a portion of said main wall, said secondary wall including a guide slot with first and second opposite ends, and a first latch supported by said secondary wall, said first latch including a latching plate and a coupling extension extending from said latching plate and through said guide slot of said secondary wall coupling said latching plate to said secondary wall, said coupling extension being slidable between said first and second ends of said guide slot to move said latching plate between latched and unlatched positions, respectively.

21. A luminaire housing according to claim 20, wherein a second secondary wall extends from said side wall.

22. A luminaire housing according to claim 21, wherein a second latch is supported on said second secondary wall, said second latch is substantially identical to said first latch.

23. A luminaire housing according to claim 21, wherein a hinge is supported on said second secondary wall, said hinge is pivotally engaged with said frame thereby allowing said panel to move between said open and closed positions.

24. A luminaire housing according to claim 20, wherein said coupling extension extends from an end of said latching plate with said coupling extension being substantially perpendicular to said latching plate.

25. A luminaire housing according to claim 20, wherein said coupling extension includes first and second portions that form a substantially T-shaped member with said first portion having a width less than a width of said guide slot and said second portion having a width greater than said width of said guide portion.

26. A luminaire housing according to claim 25, wherein said width of said second portion of said coupling extension is less than a length of said guide slot.

27. A luminaire housing according to claim 20, wherein said latching plate engages said frame and said coupling extension is located proximate said first end of said guide slot when said latch is in said latched position; and said latching plate is spaced from said frame and said coupling extension is located proximate said second end of said guide slot when said latch is in said unlatched position.

28. A luminaire housing according to claim 20, wherein said main wall includes a slot aligned with said guide slot of said secondary wall; and an actuating member extends through said slot of said main wall and through said guide slot of said secondary wall and engages said latching plate, and operation of said actuating member moves said latch between said latched and unlatched positions.

29. A luminaire housing according to claim 28, wherein said actuating member is a screw.

30. A luminaire housing, comprising:

a frame;

a panel releasably coupled to said frame and movable between open and closed positions with respect to said frame, said panel supporting a luminaire; and a switch assembly supported by said panel and including a switch housing having a lever pivotally coupled thereto and at least one electrical switch received within said switch housing, said electrical switch being electrically connected to said luminaire, said lever engaging said frame and engaging said electrical switch when said panel is in said closed position thereby turning on power to said luminaire, and said lever being disengaged from said frame and releasing said electrical switch when said panel is in said open position;

said panel includes a main wall that supports said luminaire and a side wall extending from an outer perimeter of said main wall; and a secondary wall extends from said side wall and extends over a portion of said main wall, said secondary wall supports said switch assembly.

31. A luminaire housing according to claim 30, wherein said electrical switch is connected to said luminaire by electrical wiring.

32. A luminaire housing according to claim 30, wherein said secondary wall includes a latch disposed thereon for latching said panel in said closed position.

33. A luminaire housing according to claim 30, wherein said secondary wall includes a hinge disposed thereon and pivotally coupled to said frame, said hinge being located between said secondary wall and said switch assembly.

34. A luminaire housing according to claim 30, wherein said lever includes a first end pivotally connected to said switch housing and an opposite second end that extends outside of switch housing, said second end engages said frame when said panel is in said closed position.

35. A luminaire housing according to claim 34, wherein said first end of said lever includes a portion extending through an aperture in said switch housing.

36. A laminaire housing according to claim 34, wherein said lever includes first, second and third sections with said second section being located between said first and third sections, and said first and third seconds are substantially perpendicular to said second section.

* * * * *